(12) United States Patent
Totsu

(10) Patent No.: US 8,001,874 B2
(45) Date of Patent: Aug. 23, 2011

(54) COMBINATION OF SCREW WITH STABILIZED STRENGTH AND SCREWDRIVER BIT, AND HEADER PUNCH FOR MANUFACTURING THE SCREW WITH STABILIZED STRENGTH

(76) Inventor: Katsuyuki Totsu, Sumida-ku (JP)

( * ) Notice: Subject to any disclaimer, the term of this patent is extended or adjusted under 35 U.S.C. 154(b) by 111 days.

(21) Appl. No.: 10/578,382

(22) PCT Filed: Nov. 4, 2004

(86) PCT No.: PCT/JP2004/016689
§ 371 (c)(1),
(2), (4) Date: May 5, 2006

(87) PCT Pub. No.: WO2005/047716
PCT Pub. Date: May 26, 2005

(65) Prior Publication Data
US 2007/0101835 A1  May 10, 2007

(30) Foreign Application Priority Data

Nov. 14, 2003 (JP) .................. 2003-384968
Jan. 23, 2004 (JP) .................. 2004-016309

(51) Int. Cl.
*B25B 23/00* (2006.01)
*F16B 35/06* (2006.01)
(52) U.S. Cl. ......................... 81/460; 411/404
(58) Field of Classification Search .............. 81/460, 81/436, 461; 411/402–404, 407
See application file for complete search history.

(56) References Cited

U.S. PATENT DOCUMENTS

| 2,400,684 | A | * | 5/1946 | Clark ............................... 81/460 |
| 3,108,623 | A | | 10/1963 | Muenchlinger et al. |
| 3,122,963 | A | * | 3/1964 | Borgeson ....................... 411/404 |
| 3,575,080 | A | * | 4/1971 | Hannay .......................... 411/404 |
| 5,120,173 | A | * | 6/1992 | Grady ............................ 411/404 |
| 6,164,171 | A | * | 12/2000 | Kaneko et al. .................. 81/460 |

(Continued)

FOREIGN PATENT DOCUMENTS

JP  38-26549  12/1963

(Continued)

*Primary Examiner* — David B Thomas
(74) *Attorney, Agent, or Firm* — DLA Piper LLP (US)

(57) ABSTRACT

A screw having stabilized strength, combination with a driver bit that best fits the screw, and a header punch for producing the screw. The screw having stabilized strength has letter Y-shaped bit-fitting grooves formed in the head portion of the screw. Forming the grooves makes fitting of a corresponding driver to the screw easy, prevents occurrence of a cam-out phenomenon to enhance work efficiency, makes torque transmission to be made smoothly and sufficiently, and stabilizes strength. The bit-fitting grooves are formed in a letter Y shape that is substantially equally divided into three sections in the circumferential direction, the grooves being formed at positions required distances away from the central portion of the screw head. The width of each of the grooves extending in radial directions from the central portion of the bit-fitting grooves is set so that the grooves are gradually expanded and substantially equally spaced with spacing each equal to the width of a boundary section between adjacent grooves. Further, the outer peripheral end wall surface of each bit-fitting groove is made substantially vertical from an opening edge section up to a required depth. The outer peripheral end wall surface is displaced downward from a lower edge section of the wall surface toward the central portion of the screw head, and the center where the wall surfaces meet are formed as a substantially conical bottom surface.

2 Claims, 25 Drawing Sheets

U.S. PATENT DOCUMENTS

| | | | |
|---|---|---|---|
| 6,253,649 B1* | 7/2001 | Shinjo | 81/460 |
| 6,341,546 B1* | 1/2002 | Totsu | 81/460 |
| 6,378,406 B1* | 4/2002 | Totsu | 81/460 |
| 6,453,781 B1* | 9/2002 | Casino et al. | 81/460 |
| 6,584,876 B2* | 7/2003 | Totsu | 81/460 |
| 6,886,433 B2* | 5/2005 | Totsu | 81/460 |
| 7,111,531 B1* | 9/2006 | Suzuki | 81/460 |
| 7,147,421 B2* | 12/2006 | Suzuki | 411/404 |
| 7,162,939 B2* | 1/2007 | Totsu | 81/460 |
| 2002/0029666 A1* | 3/2002 | Totsu | 81/460 |
| 2003/0002952 A1* | 1/2003 | Totsu | 411/403 |
| 2003/0059276 A1* | 3/2003 | Chen | 411/403 |
| 2005/0172762 A1* | 8/2005 | Suzuki | 81/460 |
| 2005/0268757 A1* | 12/2005 | Walker | 81/460 |
| 2007/0065254 A1* | 3/2007 | Nebl et al. | 411/403 |

FOREIGN PATENT DOCUMENTS

| | | |
|---|---|---|
| JP | 49-78663 | 7/1974 |
| JP | 50-142956 | 11/1975 |
| JP | 56-14614 | 2/1981 |
| JP | 4-62408 | 5/1992 |
| JP | 10-30625 | 2/1998 |
| JP | 3026965 | 1/2000 |
| JP | 2000-230526 | 8/2000 |
| JP | 2001-193719 | 7/2001 |
| JP | 2001-280324 | 10/2001 |

* cited by examiner

Combination of Screw with Stabilized Strength and Screwdriver Bit, and Header Punch for Manufacturing the Screw with Stabilized Strength

TECHNICAL FIELD

The present invention relates to a combination of a screw, in which a bit engaging groove formed in the screw head is divided into three equal parts in the circumferential direction so that a three-way groove respectively extending in the form of a letter "Y" in the radial direction from the central portion is formed, and a screwdriver bit, which has three tip end vane parts corresponding to the three-way groove and is suitable for use with this screw, and further relates to a header punch used to manufacture the such a screw.

BACKGROUND ART

Conventionally, in cases where screws are unnecessarily removed by a third party from devices that are completed by the connection or assembly of various types of parts by means of screw attachment, disassembly of the device or the separation of parts is performed, and adjustment locations or dangerous locations are exposed, so that it is difficult to restore the function of the device to its original form, and so that problems arise that may lead to the occurrence of emergency accidents or the like. Currently, therefore, from such a standpoint, various types of tamperproof screws have been proposed that cannot easily be tightened or removed by means of plus screwdrivers, minus screwdrivers or the like (screw turning tools) that are commonly marketed and used.

For example, a "screw" comprising a construction in which a three-forked groove is formed in the head of the screw, both sides of this groove are formed as inclined surfaces so that the groove becomes narrower as the groove becomes deeper, and the end surfaces of the groove are inclined by a specified angle (an angle smaller than 35°) with respect to the center line so that the groove becomes deeper approaching the center of the groove, has been proposed (see Patent Reference 1). More specifically, in the screw described in this Patent Reference 1, the following merits are obtained as a result of the use of the above-described structure: namely, the screwdriver bit that engages with the screw also has a thicker root, and the tip end of this bit has a thin shape; accordingly, there is no damage of the vanes of the screwdriver bit, and an accurate tightening torque can be obtained. Furthermore, since the groove of the screw has a broad width, engagement between the groove and the vanes of the screwdriver bit is relatively easy. Moreover, since the shape of the punch that is used for the press molding of the groove of the screw is also similar to the shape of the tip end of the screwdriver bit, the useful life of the punch is also extended.

Furthermore, a "tamperproof small screw" (see Patent Reference 2) has been proposed in which a Y-shaped groove is formed in the radial direction at a uniform spacing in the circumferential direction in the head of the screw, a circular conical hole that is centered on the intersection point of the respective branching grooves is formed at this intersection point, both side walls of the groove are raised directly upward from substantially the bottom surface of the groove, the end parts of the side walls of mutually adjacent branching grooves on the side of the intersection point are connected by rectilinear guide walls, and the bottom surfaces of the branching grooves are formed as inclined surfaces so that these branching grooves become shallower moving away from the center.

More specifically, the screw described in this Patent Reference 2 has the following effect: namely, there is no protruding part that protrudes into the circular conical hole; and even if an attempt is made to loosen the screw using a minus screwdriver bit (rather than using a special screwdriver bit), the tip end of the screwdriver bit does not engage with the groove, so that the screw cannot be loosened. Furthermore, the G dimension (diameter of the track circle formed by the intersecting line between the bottom surface of the three-directional groove and the circular conical hole) and the B dimension (diameter of the inscribed circle of the circular arc surface that connects the mutually adjacent branching grooves inside the track circle) are substantially the same dimension. Accordingly, the following merits are obtained: namely, since the attachment roots of the vanes of the screwdriver bit are not slender, the vanes of the screwdriver bit are not damaged during the tightening of the screw or the like.

Meanwhile, a screw tightening structure (see Patent Reference 3) has been proposed which is installed on a screw and a tightening tool that is used to tighten this screw, which has a three-forked shape having three torque transmitting parts that respectively protrude toward the outer circumference at 120-degree intervals about the center line, and which comprises an engaging hole and an engaging protruding part that engage with each other, this screw tightening structure being characterized in that (1) the torque transmitting parts have a pair of rectilinear side parts that are parallel to the direction of protrusion from the center line, (2) adjacent torque transmitting parts are respectively smoothly connected via circular arc parts that have a fixed curvature radius R, and (3) where g is the diameter of the circumscribed circle of the tip ends of the above-described three torque transmitting parts, and b is the diameter of the inscribed circle of the three above-described circular arc parts, the structure is set so that both (4) the equation $0.5\,g \leqq b \leqq 0.6\,g$, and (5) the equation $0.5b \leqq R \leqq 0.6b$, are satisfied. More specifically, in the screw tightening structure described in this Patent Reference 3, as a result of the use of the above-described construction, the following effect is obtained: namely, damage to the engaging protruding part and deformation of the engaging hole can both be suppressed, and the screw can be tightened with a higher tightening torque.

Furthermore, in order to obtain a "screw" and screwdriver bit in which the phenomenon of "come-out" tends not to occur, a screw, which has a rotating part comprising a vane engaging part that engages the vanes of the screwdriver bit and which is characterized in that the part on the tip end side of the side wall surface on one or both sides of each vane engaging part is bent in the direction moving away from the side wall surface on the opposite side with respect to the part on the base end side of this side wall surface, and a screwdriver bit, which is comprised of a vane part which engages with the vane engaging part of the above-described rotating part of this screw, have been proposed (see Patent Reference 4). More specifically, in the screw and screwdriver bit described in this Patent Reference 4, as a result of the use of the above-described construction, the effect as described below is obtained: namely, the screwdriver bit does not readily tilt with respect to the screw; furthermore, the side wall surfaces of the vane engaging part that are bent in a shape that corresponds to the bent side surfaces of the vane part bite into these side surfaces. Accordingly, the above-described side surfaces can securely grip the above-described side wall surfaces, and as a result, the engagement between the vane part and the vane engaging part is good, thus making it difficult for "come-out" of the screwdriver bit to occur.

Furthermore, a screw with a thin head which is devised so that this screw is not subjected to the propulsion force of the screwdriver bit during tightening when the screw is tightened in a relatively thin, plate-form workpiece, and which is devised so that tightening and loosening of the screw can only be accomplished using a special screwdriver bit has been proposed; and this screw with a thin head is characterized in that (1) the head which has an engaging groove is formed with a relatively small thickness, (2) a reinforcing part having a tapered shape that is large on the head side and small on the screw threads side is formed between the seating surface of the head and the screw threads of this head, and (3) the wall surface engaged by the screwdriver bit during rotation in at least the tightening direction of the above-described engaging groove is formed as a planar surface that is substantially parallel to the axial line of the screw (see Patent Reference 5). More specifically, in the screw with a thin head described in this Patent Reference 5, as a result of the use of the above-described construction, such effects are obtained that the reinforcing part prevents a reduction in the thickness of the neck part with the engaging groove even in working that reduces the thickness of the head by press working, without any loss of the inherent function of the screw as a compact part but having a certain thickness that is used on relatively thin products; accordingly, the phenomenon of "neck stripping" of the screw does not occur, so that the function of this screw as a screw can be sufficiently manifested; and even when the screw is used in the assembly of precision electronic devices, the screw cannot be loosened unless a special screwdriver bit is used, so that the danger of unforeseen accidents occurring due to erroneous repairs performed by the user is small, and the screw thus also shows promise as a preventive measure.

Patent Reference 1: Japanese Utility Model Application Laid-Open (Kokai) No. H4-62408

Patent Reference 2: Japanese Patent Application Laid-Open (Kokai) No. H10-30625

Patent Reference 3: Japanese Patent No. 3026965

Patent Reference 4: Japanese Patent Application Laid-Open (Kokai) No. 2000-230526

Patent Reference 5: Japanese Patent Application Laid-Open (Kokai) No. 2001-280324

DISCLOSURE OF INVENTION

The various types of conventional screws described above in which a Y-shaped bit engaging groove is formed in the screw head have applications as so-called tamperproof screws in which the tightening or removal of the screw using a general commercially marketed screwdriver bit is difficult. Compared to common conventional screw and screwdriver combinations, tamperproof screws have special shape constructions in the engaging part of the screw head and the tip end of the screwdriver bit that engages with this engaging part. As a result, they have such problems that considerable effort is required in the manufacture of the screw and screwdriver, and the manufacturing cost is high.

In particular, in regard to the bit engaging groove that is formed in the screw head, in cases where this groove is formed as a Y-shaped groove, there is a tendency to form the respective branching grooves with a narrow width in order to prevent the phenomenon of "come-out" of the screwdriver bit. As a result, in regard to the shape of the tip end blade part of the corresponding screwdriver bit as well, the thickness of the blade pieces that engage with the respective branching groves is small, thus resulting in a drop in strength, so that there are difficulties in terms of durability. Accordingly, it is also possible to form the respective branching grooves of the bit engaging groove with an increased width and to strengthen the shape of the tip end blade part of the corresponding screwdriver bit. In this case, however, there are difficulties. The phenomenon of "come-out" of the screwdriver bit tends to occur. Accordingly, conventional combinations of screws and screwdrivers of this type are limited to special applications.

Furthermore, in order to prevent the "come-out" phenomenon of the screwdriver bit, such a technique has been proposed that the side wall surfaces of the tip end groove parts of the bit engaging groove are bent, and the shape of the tip end blade part of the corresponding screwdriver bit has a shape that the respective peripheral edge parts are bent. In this case, however, the shape of the bit engaging groove of the screw and the shape of the tip end blade pars of the screwdriver bit respectively become more complicated, leading to complications in manufacture and an increase in the manufacturing cost.

Accordingly, the inventors conducted various investigations and manufacturing trials in order to obtain a screw and a screwdriver bit suitable for use with this screw, in which the shape structure of a screw in which a Y-shaped bit engaging groove is formed in the screw head is improved so that the screw is usable as an all-purpose screw, thus making it possible to reduce the occurrence of the phenomenon of "come-out", to simplify the shape structure of the corresponding screwdriver bit, to stabilize the screw in terms of strength, to facilitate manufacture and to lower the manufacturing cost. As a result, the inventors succeeded in manufacturing a screw with stabilized strength and a screwdriver bit suitable for use with the screw, which make it possible to solve all of the conventional problems described above.

More specifically, the inventors discovered that in a screw in which a Y-shaped bit engaging groove is formed in the screw head, the number of grooves constituting the bit engaging groove can be reduced compared to a conventional cruciform groove by (1) forming a bit engaging groove formed in a Y shape which is divided into three substantially equal parts in the circumferential direction at a specified radial distance from the central portion of the screw head, (2) forming the groove width of the respective branching grooves that extend in the radial direction from the central portion of the above-described bit engaging groove so that this width gradually expands, thus ensuring that the width dimensions of the boundary portions of respective adjacent grooves are substantially equal intervals, and (3) forming the respective outer circumferential end wall surfaces of the bit engaging groove so that these wall surfaces are substantially perpendicular to a specified depth from the opening edge parts, and displacing the perpendicular lower edge portions downward more toward the central portion of the screw neck, so that the central portion of intersection is formed substantially as a circular conical bottom surface, thus making it possible to obtain a screw with stabilized strength in which the engagement operation with the corresponding screwdriver bit is facilitated, the occurrence of the phenomenon of "come-out" is prevented, the transmission of torque is smooth and sufficient, the screw is stabilized in terms of strength, and manufacture of the screw is easy.

Furthermore, the inventors discovered that in the above-described screw with stabilized strength, an appropriate engagement operation of the tip end blade part of the screwdriver bit with respect to the bit engaging groove can be accomplished more quickly and smoothly by forming the surface of the screw head that forms the boundary portions which are between the respective adjacent branching grooves of the bit engaging groove with inclined surface portions that are inclined gradually downward toward the central portion of the bit engaging groove.

Furthermore, for the screw with stabilized strength comprising the above-described construction, the inventors discovered that a screwdriver bit that is most suited to the above-described screw with stabilized strength can be obtained by constructing a screwdriver bit with a tip end blade part, vane parts, inclined parts, and protruding parts, wherein the vane parts are respectively formed on the tip end blade part and have end edge parts that have a substantially right-angled shape to obtuse angular shape and engage with the respective branching grooves of the bit engaging groove formed in a Y shape divided into three substantially equal parts in the circumferential direction in the head of the above-described screw with stabilized strength, the inclined parts are respectively formed on the tip ends of the above-described respective vane parts and match the displaced portions of the above-described bit engaging groove, and the protruding parts are formed to intersect and connect in a circular conical shape in the central axial part of the screwdriver bit.

Furthermore, for a screw with stabilized strength comprising the above-described construction, the inventors discovered that a header punch that is most suitable for use in the manufacture of the above-described screw with stabilized strength can be obtained by constructing a header punch that includes protruding parts and a circular conical protruding part, wherein the protruding parts have perpendicular end wall parts used to form, in a substantially perpendicular attitude, the respective outer circumferential end wall surfaces of the bit engaging groove formed in a Y shape divided into three substantially equal parts in the circumferential direction in the screw head; and the circular conical protruding part that is used to form the circular conical bottom surface of the above-described bit engaging groove is formed on the tip ends of the above-described protruding parts.

Accordingly, it is an object of the present invention to obtain a screw with stabilized strength in which a Y-shaped bit engaging groove is formed in the screw head, wherein the bit engaging groove is formed so that the engaging operation with a corresponding screwdriver bit is easy, the occurrence of the phenomenon of "come-out" is prevented so that the working efficiency improves, and the screw is stabilized in terms of strength with smooth and sufficient transmission of torque, and to provide a combination or such a screw with stabilized strength and a screwdriver bit that is most suitable for this screw, and further to provide a header punch that is used to manufacture this screw.

In order to accomplish the above-described object, the screw with stabilized strength of the present invention is characterized in that:

a bit engaging groove is formed in a Y shape divided into three substantially equal parts in the circumferential direction at a specified radial distance from the central portion of the screw head, the groove widths of the respective branching grooves that extend in the radial direction from the central portion of the above-described bit engaging groove are formed so that these widths gradually expand, thus producing substantially equal intervals with the width dimension of the boundary portions which are between respective adjacent branching grooves, and the respective outer circumferential end wall surfaces of the above-described bit engaging groove are formed in a substantially perpendicular attitude to a specified depth from the opening edge part, and are then displaced downward toward the central portion of the screw neck from the perpendicular lower edge portions, with the intersecting central portion being formed as a substantially circular conical bottom surface.

The screw with stabilized strength of the present invention is characterized in that:

a bit engaging groove is formed in a Y shape divided into three substantially equal parts in the circumferential direction at a specified radial distance from the central portion of the screw head, the groove widths of the respective branching grooves that extend in the radial direction from the central portion of the above-described bit engaging groove are formed so that these widths gradually expand, thus producing substantially equal intervals with the width dimension of the boundary portions which are between respective adjacent branching grooves, and the respective outer circumferential end wall surfaces of the above-described bit engaging groove are formed so that the opening edge part sides of these wall surfaces expand in width at a specified angle and are substantially perpendicular to a specified depth, and are then displaced downward toward the central portion of the screw neck from the perpendicular lower edge portions, with the intersecting central portion being formed as a substantially circular conical bottom surface.

The screw with stabilized strength of the present invention is characterized in that in the above-described screw head in which a bit engaging groove formed in a Y shape divided into three substantially equal parts in the circumferential direction is provided, the boundary portions formed between respective adjacent branching grooves are formed so that these boundary portions are adjacent via respective planar side wall surfaces that intersect at obtuse angles showing left-right symmetry with respect to the respective branching grooves in the central portion of the bit engaging groove.

The screw with stabilized strength of the present invention is characterized in that the above-described bit engaging groove is provided with respective step parts that are displaced at an inclination downward toward the central portion of the screw neck from the perpendicular lower edge portions of the respective outer circumferential end wall surfaces.

The screw with stabilized strength of the present invention is characterized in that the above-described bit engaging groove is formed with the intersecting central portion of the above-described respective step parts that are displaced with an inclination formed as a substantially circular conical bottom surface.

The screw with stabilized strength of the present invention, is characterized in that the boundary portions that are formed between the respective adjacent branching grooves of the above-described bit engaging groove are formed so that these boundary portions are adjacent via bent side wall surfaces showing left-right symmetry with respect to the respective branching grooves in the central portion of the bit engaging groove.

The screw with stabilized strength of the present invention is characterized in that the boundary portions that are formed between the respective adjacent branching grooves of the above-described bit engaging groove are formed so that these boundary portions are adjacent via respective planar side wall surfaces that intersect at obtuse angles showing left-right symmetry with respect to the respective branching grooves in the central portion of the bit engaging groove.

The screw with stabilized strength of the present invention is characterized in that the above-described screw head in which a bit engaging groove formed in a Y shape divided into three substantially equal parts in the circumferential direction is provided is constituted in a pan-form or dish-form shape.

The screw with stabilized strength of the present invention is characterized in that:

a bit engaging groove is formed in a Y shape divided into three substantially equal parts in the circumferential direction at a specified radial distance from the central portion of the screw head, the groove widths of the respective branching grooves that extend in the radial direction from the central portion of the above-described bit engaging groove are formed so that these widths gradually expand, thus producing substantially equal intervals with the width dimension of the boundary portions which are between respective adjacent branching grooves, the respective outer circumferential, end wall surfaces of the above-described bit engaging groove are formed in a substantially perpendicular attitude to a specified depth from the opening edge part, and are then displaced downward toward the central portion of the screw neck from the perpendicular lower edge portions, with the intersecting central portion being formed as a substantially circular conical bottom surface, and the surface of the screw head that forms the boundary portions which are between the respective adjacent branching grooves of the above-described bit engaging groove is formed as an inclined surface portion that is inclined gradually downward toward the central portion of the bit engaging groove.

The screw with stabilized strength of the present invention is characterized in that:

a bit engaging groove is formed in a Y shape divided into three substantially equal parts in the circumferential direction at a specified radial distance from the central portion of the screw head, the groove widths of the respective branching grooves that extend in the radial direction from the central portion of the above-described bit engaging groove are formed so that these widths gradually expand, thus producing substantially equal intervals with the width dimension of the boundary portions which are between respective adjacent branching grooves, the respective outer circumferential end wall surfaces of the above-described bit engaging groove are formed so that the opening edge part sides of these wall surfaces expand in width at a specified angle and are substantially perpendicular to a specified depth, and are then displaced downward toward the central portion of the screw neck from the perpendicular lower edge portions, with the intersecting central portion being formed as a substantially circular conical bottom surface, and the surface of the screw head that forms the boundary portions which are between the respective adjacent branching grooves of the above-described bit engaging groove is formed as an inclined surface portion that is inclined gradually downward toward the central portion of the bit engaging groove.

The screw with stabilized strength of the present invention is characterized in that an inclined surface portion formed on the surface of the screw head that forms the boundary portions which are between the respective adjacent branching grooves of the above-described bit engaging groove is constructed so that this inclined surface portion is inclined at an angle of 20 degree to 50 degree toward the central portion of the bit engaging groove from the inner diameter sides of the respective outer circumferential end edge parts of the above-described bit engaging groove.

The combination of a screw with stabilized strength and a screwdriver bit is characterized in that in this combination:

the screw with stabilized strength is characterized in that:

a bit engaging groove is formed in a X shape divided into three substantially equal parts in the circumferential direction at a specified radial distance from the central portion of the screw head, the groove widths of the respective branching grooves that extend in the radial direction from the central portion of the above-described bit engaging groove are formed so that these widths gradually expand, thus producing substantially equal intervals with the width dimension of the boundary portions which are between respective adjacent branching grooves, and the respective outer circumferential end wall surfaces of the above-described bit engaging groove are formed in a substantially perpendicular attitude to a specified depth from the opening edge part, and are then displaced downward toward the central portion of the screw neck from the perpendicular lower edge portions, with the intersecting central portion being formed as a substantially circular conical bottom surface; and the screwdriver bit is characterized in that it comprises a tip end blade part, vane parts, inclined parts, and protruding parts, wherein the vane parts are respectively formed on the tip end blade part and have end edge parts that have a substantially right-angled shape to obtuse angular shape and engage with the respective branching grooves of the bit engaging groove formed in a Y shape divided into three substantially equal parts in the circumferential direction in the head of the above-described screw with stabilized strength, the inclined parts are respectively formed on the tip ends of the above-described respective vane parts and match the displaced portions of the above-described bit engaging groove, and the protruding parts are formed to intersect and connect in a circular conical shape in the central axial part of the screwdriver bit.

The combination of a screw with stabilized strength and a screwdriver bit is characterized in that in this combination:

the screw with stabilized strength is characterized in that:

bit engaging groove is formed in a Y shape divided into three substantially equal parts in the circumferential direction at a specified radial distance from the central portion of the screw head, the groove widths of the respective branching grooves that extend in the radial direction from the central portion of the above-described bit engaging groove are formed so that these widths gradually expand, thus producing substantially equal intervals with the width dimension of the boundary portions which are between respective adjacent branching grooves, and the respective outer circumferential end wall surfaces of the above-described bit engaging groove are formed so that the opening edge part sides of these wall surfaces expand in width at a specified angle and are substantially perpendicular to a specified depth, and are then displaced downward toward the central portion of the screw neck from the perpendicular lower edge portions, with the intersecting central portion being formed as a substantially circular conical bottom surface; and the screwdriver bit is characterized in that it comprises a tip end blade hart, vane parts, inclined parts, and protruding parts wherein:

the vane parts are respectively formed on the tip end blade part and have end edge parts that have a substantially right-angled shape to obtuse angular shape and engage with the respective branching grooves of the bit engaging groove formed in a Y shape divided into three substantially equal parts in the circumferential direction in the head of the above-described screw with stabilized strength, the inclined parts are respectively formed on the tip ends of the above-described respective vane parts and match the displaced portions of the above-described bit engaging groove, and the protruding parts are formed to intersect and connect in a circular conical shape in the central axial part of the screwdriver bit.

The combination of a screw with stabilized strength and a screwdriver bit is characterized in that in this combination:

the screw with stabilized strength is characterized in that:

a bit engaging groove is formed in a Y shape divided into three substantially equal parts in the circumferential direction at a specified radial distance from the central portion of the screw head, the groove widths of the respective branching grooves that extend in the radial direction from the central portion of the above-described bit engaging groove are formed so that these widths gradually expand, thus producing substantially equal intervals with the width dimension of the boundary portions which are between respective adjacent branching grooves, the respective outer circumferential end wall surfaces of the above-described bit engaging groove are formed in a substantially perpendicular attitude to a specified depth from the opening edge part, and are then displaced downward toward the central portion of the screw neck from the perpendicular lower edge portions, with the intersecting central portion being formed as a substantially circular conical bottom surface, and the surface of the screw head that forms the boundary portions which are between the respective adjacent branching grooves of the above-described bit engaging groove is formed as an inclined surface portion that is inclined gradually downward toward the central portion of the bit engaging groove; and the screwdriver bit is characterized in that it comprises a tip end blade part, vane parts, inclined parts, and protruding parts wherein:

the vane parts are respectively formed on the tip end blade part and have end edge parts that have a substantially right-angled shape to obtuse angular shape and engage with the respective branching grooves of the bit engaging groove formed in a Y shape divided into three substantially equal parts in the circumferential direction in the head of the above-described screw with stabilized strength, the inclined parts that match the displaced portions of the above-described bit engaging groove are respectively formed on the tip ends of the above-described respective vane parts, and the protruding parts are formed to intersect and connect in a circular conical shape in the central axial part of the screwdriver bit.

The combination of a screw with stabilized strength and a screwdriver bit is characterized in that in this combination:

the screw with stabilized strength is characterized in that:

a bit engaging groove is formed in a Y shape divided into three substantially equal parts in the circumferential direction at a specified radial distance from the central portion of the screw head, the groove widths of the respective branching grooves that extend in the radial direction from the central portion of the above-described bit engaging groove are formed so that these widths gradually expand, thus producing substantially equal intervals with the width dimension of the boundary portions which are between respective adjacent branching grooves, the respective outer circumferential end wall surfaces of the above-described bit engaging groove are formed so that the opening edge part sides of these wall surfaces expand in width at a specified angle and are substantially perpendicular to a specified depth, and are then displaced downward toward the central portion of the screw neck from the perpendicular lower edge portions, with the intersecting central portion being formed as a substantially circular conical bottom surface, and the surface of the screw head that forms the boundary portions which are between the respective adjacent branching grooves of the above-described bit engaging groove is formed as an inclined surface portion that is inclined gradually downward toward the central portion of the bit engaging groove; and the screwdriver bit is characterized in that it comprises a tip end blade part, vane parts, inclined parts, and protruding parts wherein:

the vane parts are respectively formed on the tip end blade part and have end edge parts that have a substantially right-angled shape to obtuse angular shape and engage with the respective branching grooves of the bit engaging groove formed in a Y shape divided into three substantially equal parts in the circumferential direction in the head of the above-described screw with stabilized strength, the inclined parts that match the displaced portions of the above-described bit engaging groove are respectively formed on the tip ends of the above-described respective vane parts, and the protruding parts are formed to intersect and connect in a circular conical shape in the central axial part of the screwdriver bit.

The combination of a screw with stabilized strength and a screwdriver bit is characterized in that:

in the above-described screw with stabilized strength, the bit engaging groove is provided with respective step parts that are displaced at an inclination downward toward the central portion of the screw neck from the perpendicular lower edge portions of the respective outer circumferential end wall surfaces, and the intersecting center part of the above-described step parts that are displaced at an inclination is formed as a substantially circular conical bottom surface; and in the above-described screwdriver bit, step parts that match the step parts that are displaced at an inclination in the above-described bit engaging groove are formed on the tip ends of the above-described respective vane parts, and the protruding parts are formed to intersect and connect in a circular conical shape in the central axial part of the screwdriver bit.

The combination of a screw with stabilized strength and a screwdriver bit is characterized in that the above-described screwdriver bit is formed so that the vane widths of the respective vane parts extending in the radial direction from the central axial, part of the tip end blade part gradually expand so as to constitute intervals that are substantially equal to the width dimension of the cut-in parts between the respective adjacent vane parts.

The header punch of the present invention used for the manufacture of the above-described screw with stabilized strength is characterized in that:

protruding parts, which have perpendicular end wall parts used to form the respective outer circumferential end wall surfaces of the bit engaging groove formed in a Y shape divided into three equal parts in the circumferential direction in the screw head so that the wall surfaces are perpendicular to a specified depth, are respectively provided, and a circular conical protruding part which is used to form the circular conical bottom surface of the bit engaging groove is disposed on the tip ends of the above-described protruding parts.

The header punch of the present invention used for the manufacture of the above-described screw with stabilized strength is characterized in that:

protruding parts respectively have inclined end wall parts and perpendicular end wall parts that are provided for forming respective outer circumferential end wall surfaces of a bit engaging groove formed in a Y shape divided into three equal parts in a circumferential direction in a screw head, the inclined end wall parts being used to expand opening edge part sides in width at a specified angle, and the perpendicular end wall parts being used to form the wall surfaces so that the wall surfaces are perpendicular to a specified depth; and a circular conical protruding part which is used to form the circular conical bottom surface of the bit engaging groove is disposed on the tip ends of the above-described protruding parts.

The header punch, of the present invention used for the manufacture of the above-described screw with stabilized strength is characterized in that inclined protruding parts are provided which are used to form inclined surface portions that are inclined gradually downward toward the central portion of the bit engaging groove with respect to the boundary portions which arc between the respective protruding parts that are adjacent in the circumferential direction of the base portions of the above-described protruding parts.

The header punch of the present invention used for the manufacture of the above-described screw with stabilized strength is characterized in that:

step parts, which are used to form the step parts of the bit engaging groove that are displaced at an inclination, are respectively provided on the tip ends of the above-described protruding parts, and a circular conical protruding part, which is used to form the circular conical bottom part of the above-described bit engaging groove, is provided on the intersecting central portion of these step parts.

EFFECT OF THE INVENTION

In the screw with stabilized strength of the present invention, as a result of the modification of the shape and structure of the bit engaging groove in a screw in which a Y-shaped bit engaging groove is formed in the screw head, the engagement operation with the corresponding screwdriver bit is easy, the occurrence of the phenomenon of "come-out" is prevented so that the working efficiency is high, and a uniform dispersion of torque transmission is realized so that this transmission is smooth and sufficient, thus stabilizing the screw in terms of strength as well.

In the screw with stabilized strength of the present invention, as a result of the shape and structure of the bit engaging groove, the strength of the header punch that is used to manufacture this screw is high, and as a result, the mass production of a screw of this type is made possible. Furthermore, since the engaging operation with the screwdriver bit is easy, application to recycled products and maintenance work is facilitated or made more efficient, so that the screw is usable advantageously as an all-purpose screw. In particular, in the screw with stabilized strength of the present invention, since inclined surface portions are formed in the boundary portions which are between the respective branching grooves of the bit engaging groove in the screw head, an appropriate engaging operation of the tip end blade part of the screwdriver bit with respect to the bit engaging groove can be advantageously accomplished smoothly and quickly.

In the combination of a screw with stabilized strength and a screwdriver bit of the present invention, as a result of the shape and structure of the bit tip end being modified in accordance with the shape and structure of the bit engaging groove of the above-described screw with stabilized strength, a connection with the screw with stabilized strength is accomplished quickly and easily. Furthermore, the phenomenon of "come-out" during screw tightening work is securely prevented, and the working characteristics are improved. Moreover, other effects such as the stabilization of the strength of the bit tip end blade part so that a structure that is superior in terms of safety can be formed and the like are also obtained. More specifically, in the combination of a screw with stabilized strength and a screwdriver bit of the present invention, since the tip end blade part of the screwdriver bit is reinforced, damage and displacement of the tip end blade part during tightening of the screw is eliminated, so that problems such as various types of trouble with the screw, "come-out" and the like is completely prevented, and the combination is advantageously utilized as an all-purpose tightening fitting.

In the combination of a screw with stabilized strength and a screwdriver bit of the present invention, as a result of the shape and structure of the bit engaging groove, the structure of the tip end blade part of the corresponding screwdriver bit is reinforced. Consequently, damage and displacement (bending and the like) of the tip end blade part during screw tightening work is eliminated, so that problems such as various types of trouble with the screw, "come-out" and the like is completely prevented, and a screw that is superior in terms of wear resistance is obtained. Accordingly, the advantage of maintenance-free operation when the present invention is applied to automated machinery is obtained, and the combination is advantageously utilized as an all-purpose tightening fitting.

In the header punch of the present invention used for the manufacture of the screw with, stabilized strength, as a result of the modification of the shape and structure adapted to form the bit engaging groove of the screw with stabilized strength, a screw with stabilized strength which is stabilized in terms of strength as described above is manufactured easily and at a low cost. More specifically, as a result of the shape and structure of the punch being modified in accordance with the shape and structure of the bit engaging groove of the screw with stabilized strength, the strength of the punch is stabilized so that the durability is improved, which is extremely effective for the mass production of screws of this type.

Figure 1:
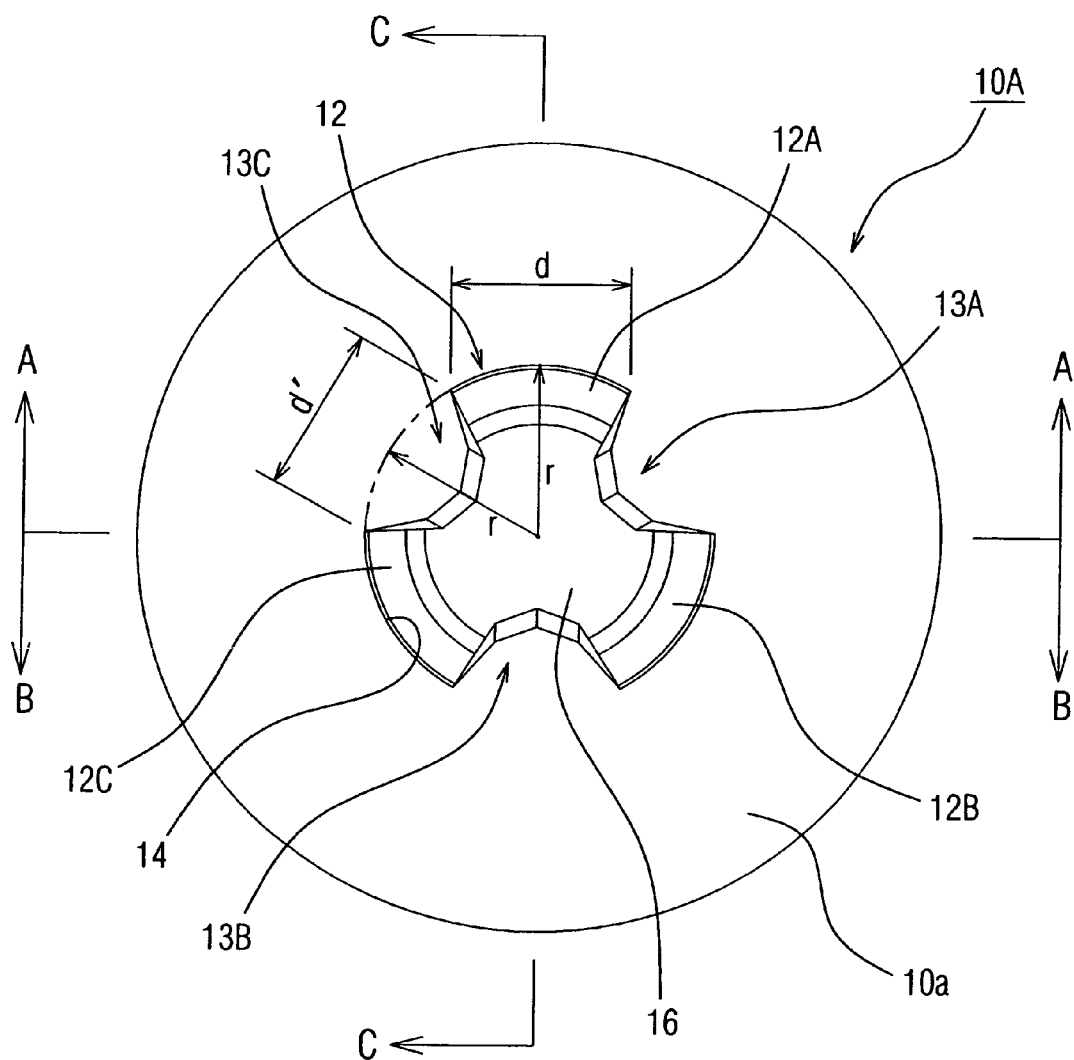
FIG. 1 is a top view of the head of a screw with stabilized strength in which the head is constructed as a pot-shaped head as a first embodiment of the screw with stabilized strength according to the present invention.
Figure 2:
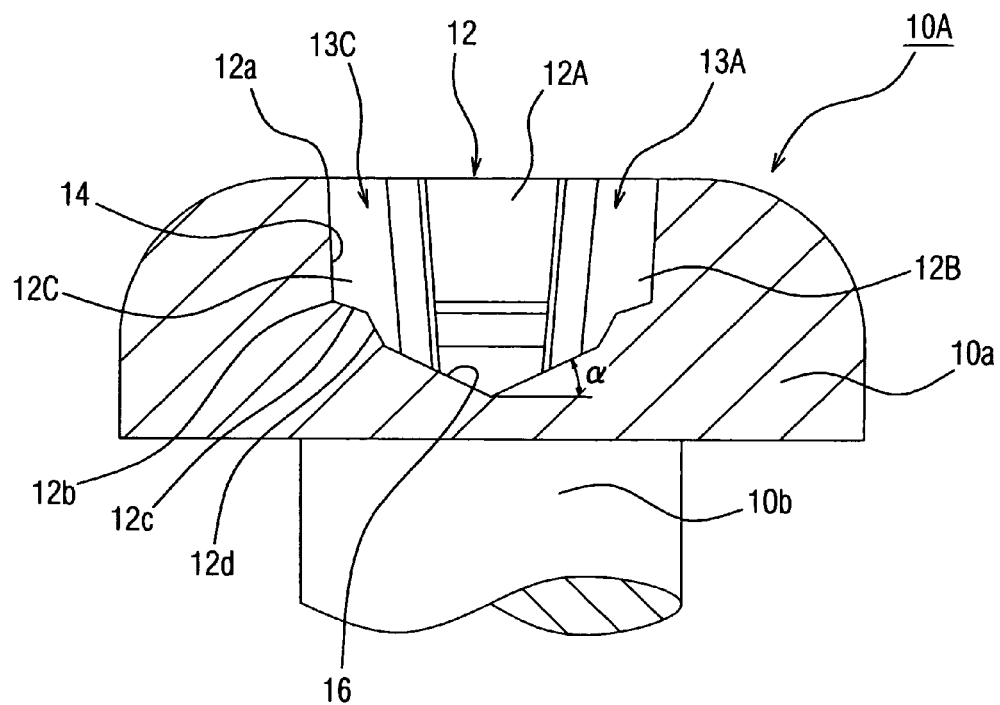
FIG. 2 is a sectional view of the essential portion taken along the line A-A in the screw with stabilized strength of the embodiment shown in FIG. 1.
Figure 3:
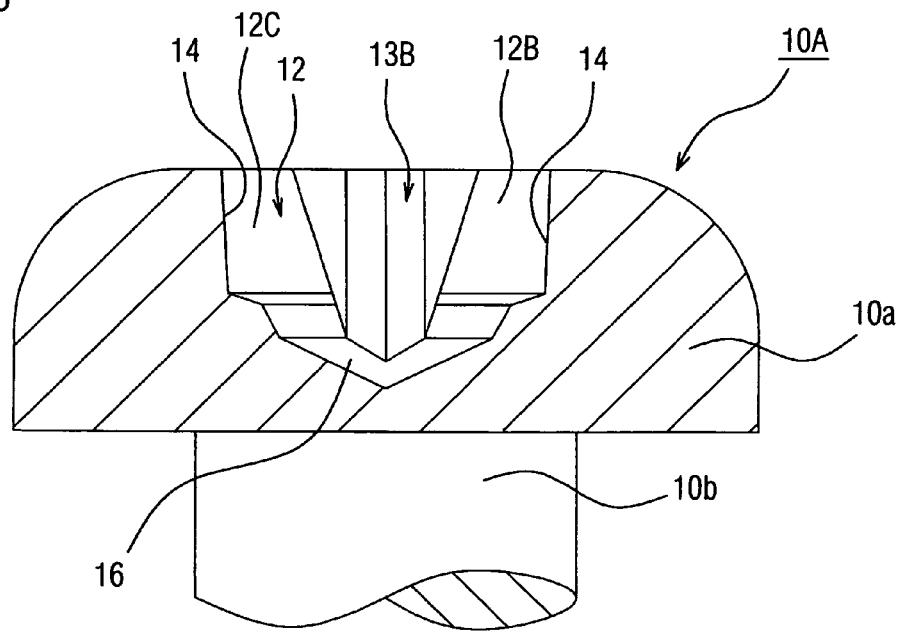
FIG. 3 is a sectional view of the essential portion taken along the line B-B in the screw with stabilized strength of the embodiment shown in FIG. 1.
Figure 4:
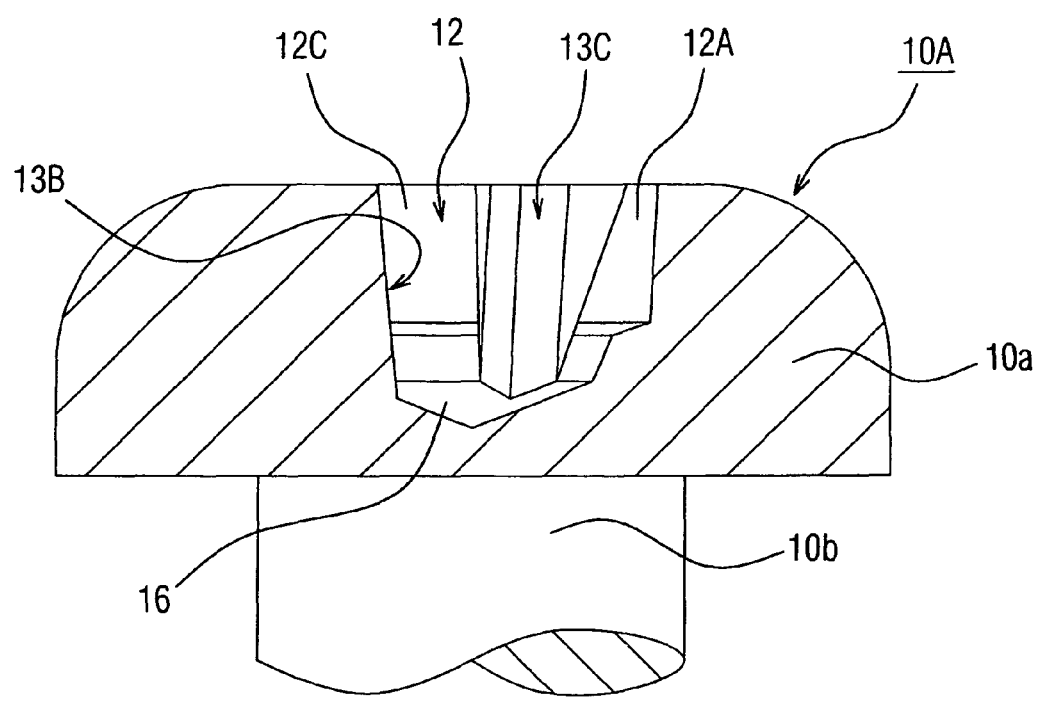
FIG. 4 is a sectional view of the essential portion taken along the line C-C in the screw with stabilized strength of the embodiment shown in FIG. 1.
Figure 5:
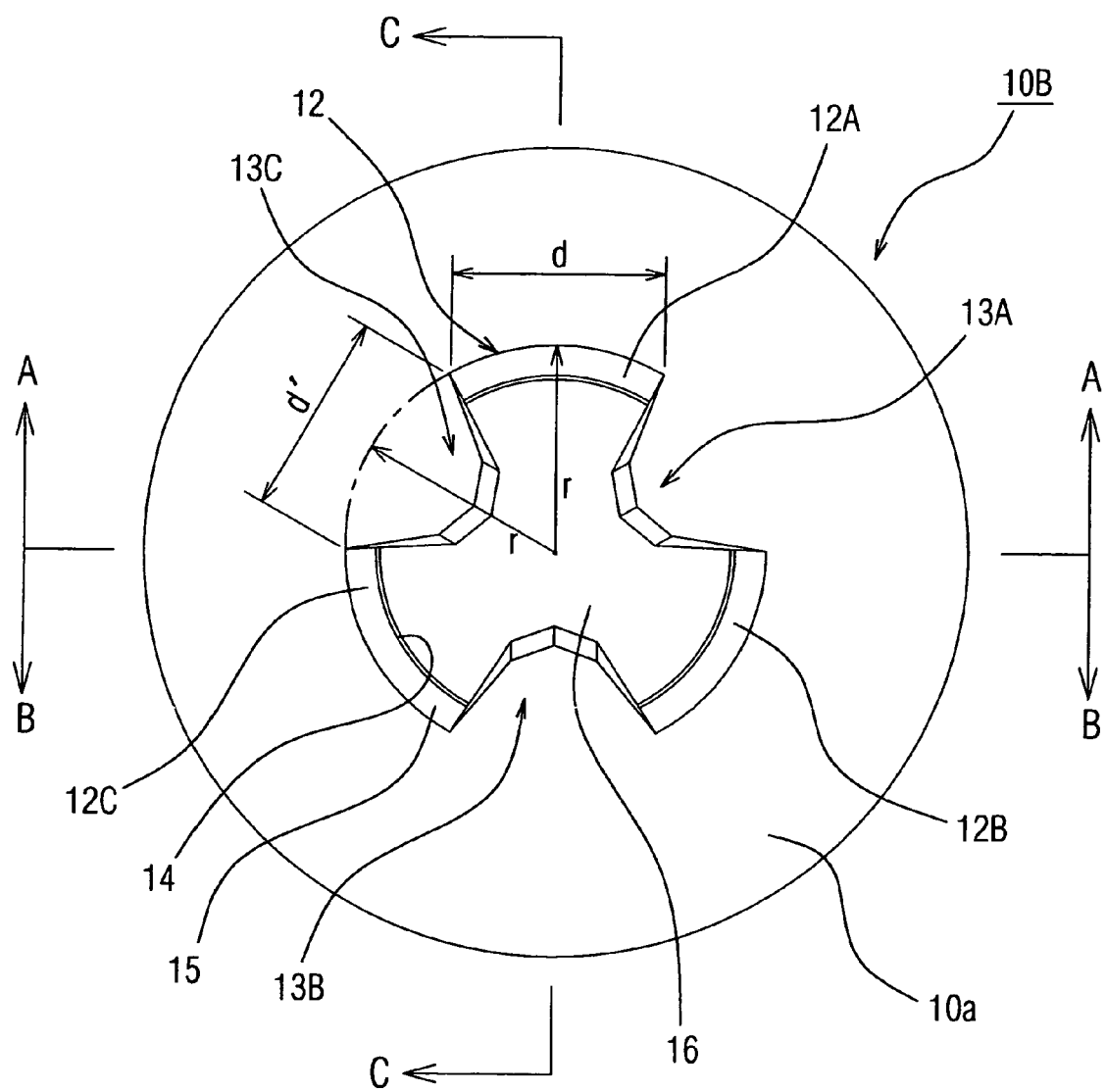
FIG. 5 is a top view of the head of a screw with stabilized strength in which the head is constructed as a pan-shaped head as a second embodiment of the screw with stabilized strength according to the present invention.
Figure 6:
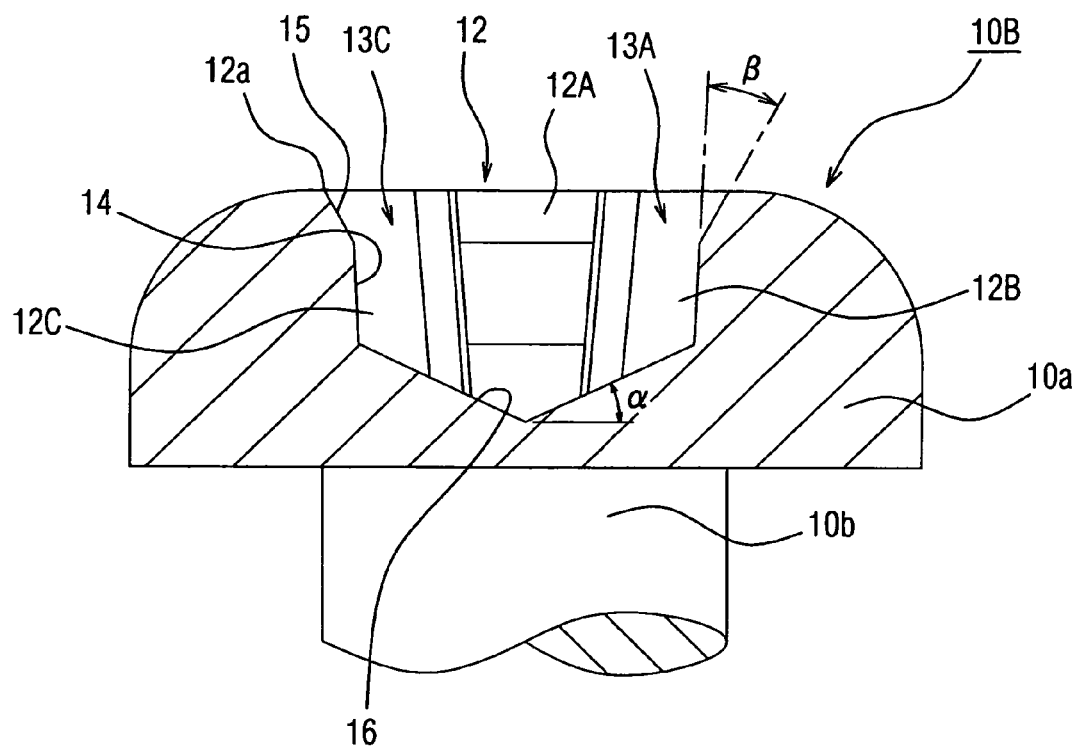
FIG. 6 is a sectional view of the essential portion taken along the line A-A in the screw with stabilized strength of the embodiment shown in FIG. 5.
Figure 7:
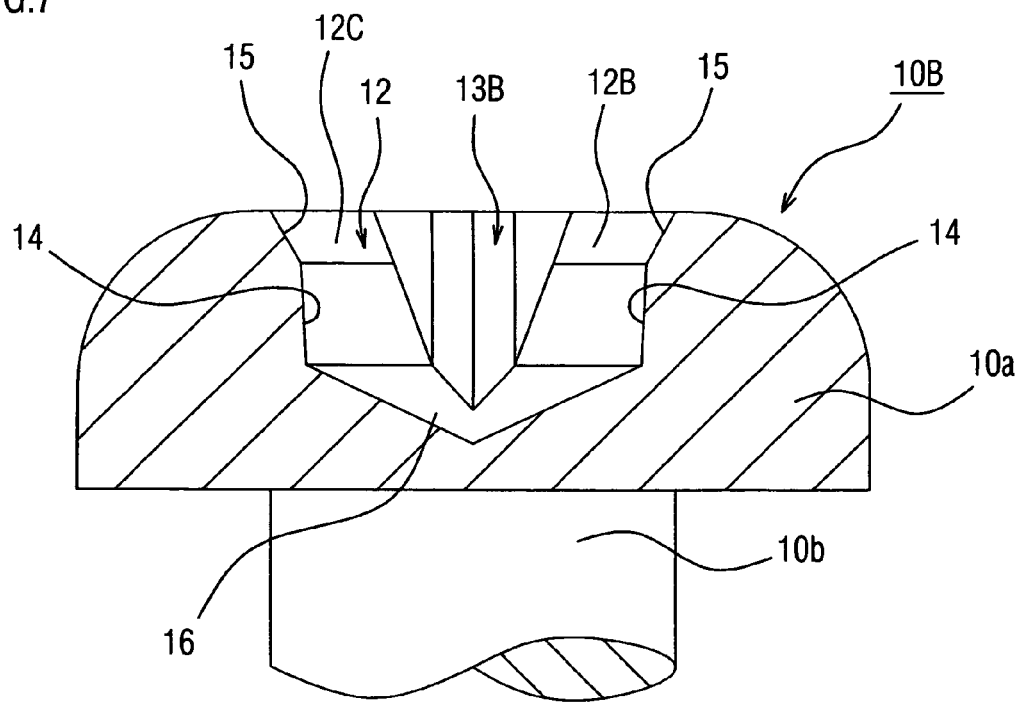
FIG. 7 is a sectional view of the essential portion taken along the line B-B in the screw with stabilized strength of the embodiment shown in FIG. 5.
Figure 8:
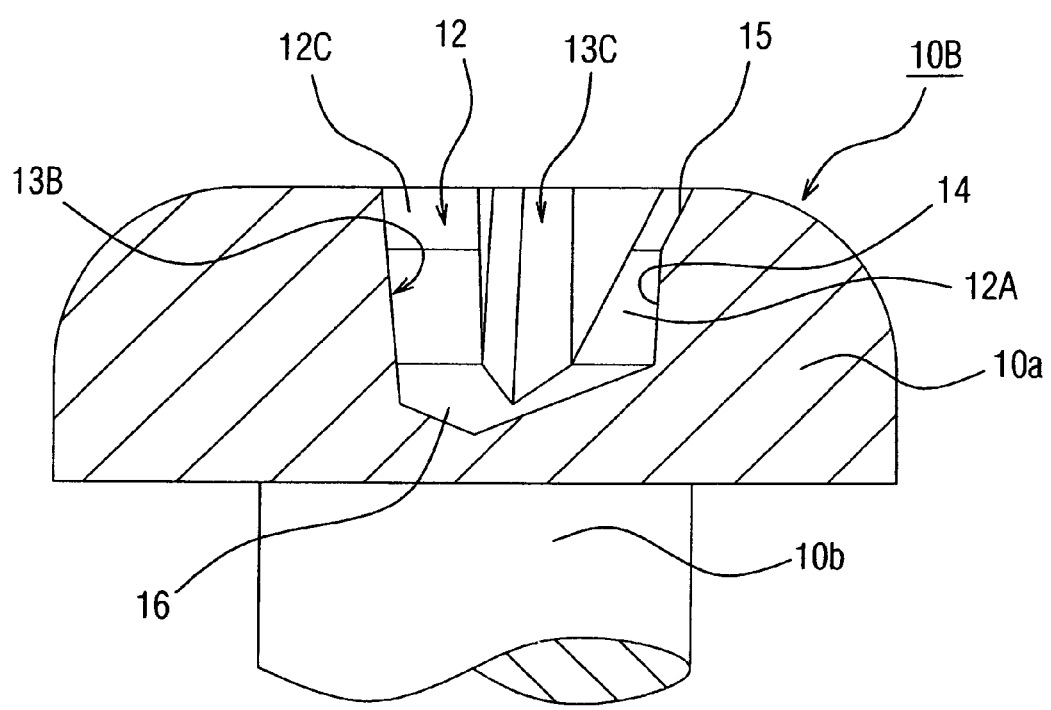
FIG. 8 is a sectional view of the essential portion taken along the line C-C in the screw with stabilized strength of the embodiment shown in FIG. 5.

EXPLANATION OF REFERENCE NUMERALS 10A, 10B, 10C, 10D, 10E Screw with stabilized strength
10B' Screw with stabilized strength 10E having small dimensions
10E' Screw with stabilized strength 10B having large dimensions
10a Screw head
10b Screw neck
12 Bit engaging groove
12A, 12B, 12C Respective branching grooves
12a Opening edge part
12a' Lower edge part
12b Lower edge part
12c, 12d Step part displaced at an inclination
13A, 13B, 13C Boundary portion
14 Perpendicular surface part of outer circumferential end wall surface
15 Inclined surface portion of outer circumferential end wall surface
16 Bottom surface
18 Inclined surface portion
19 Side wall part of boundary portion
r Radius
d Groove width
d' Width of boundary portion
α Angle of circular conical bottom surface
β Angle of inclined surface portion of outer circumferential end wall surface
20, 20' Screwdriver bit 20a Tip end blade part
21 Screwdriver bit
22A, 22B, 22C Vane parts
23A, 23B, 23C Cut-in parts
22a End edge part
22b Horizontal surface or gradually inclined surface
24 Step part
25 Step part
26 Protruding part
r' Radius
w Vane width
w' Width of cut-in part
30A, 3B, 30C Header punch
32A, 32B, 32C Protruding part
32a Perpendicular end wall part
32b Inclined end wall part
34 Step part
36 Circular conical protruding part
38 Inclined protruding part

BEST MODE FOR CARRYING OUT THE INVENTION

Next, respective embodiments of the combination of a screw with stabilized strength and a screwdriver bit of the present invention and of the header punch of the present invention used to manufacture this screw with stabilized strength will be described in detail with reference to the accompanying drawings.

Embodiment 1

Example of Construction 1 of Screw with Stabilized Strength

FIGS. 1 through 4 show a first embodiment of the screw with stabilized strength according to the present invention. More specifically, in FIGS. 1 through 4, the reference numeral 10A indicates the screw with stabilized strength according to the present invention. The head 10a of this screw 10A is formed in the shape of a pan, and a bit engaging groove 12 is formed in the center of the top part of this head 10a.

The bit engaging groove 12 of the screw with stabilized strength 10A in the present embodiment has a construction in which the groove 12 is divided into three substantially equal parts in the circumferential direction to form a Y shape at a specified radial distance r from the central portion of the screw head 10a. In this case, the groove width d of the respective branching bit engaging grooves 12A, 12B and 12C extending in the direction of the radius r from the central portion of the bit engaging groove 12 is formed so that the width gradually expands, thus causing the width d to be substantially equal to the width dimension d' of the boundary portions 13A, 13B and 13C between the respective adjacent branching grooves (see FIG. 1).

Figure 9:
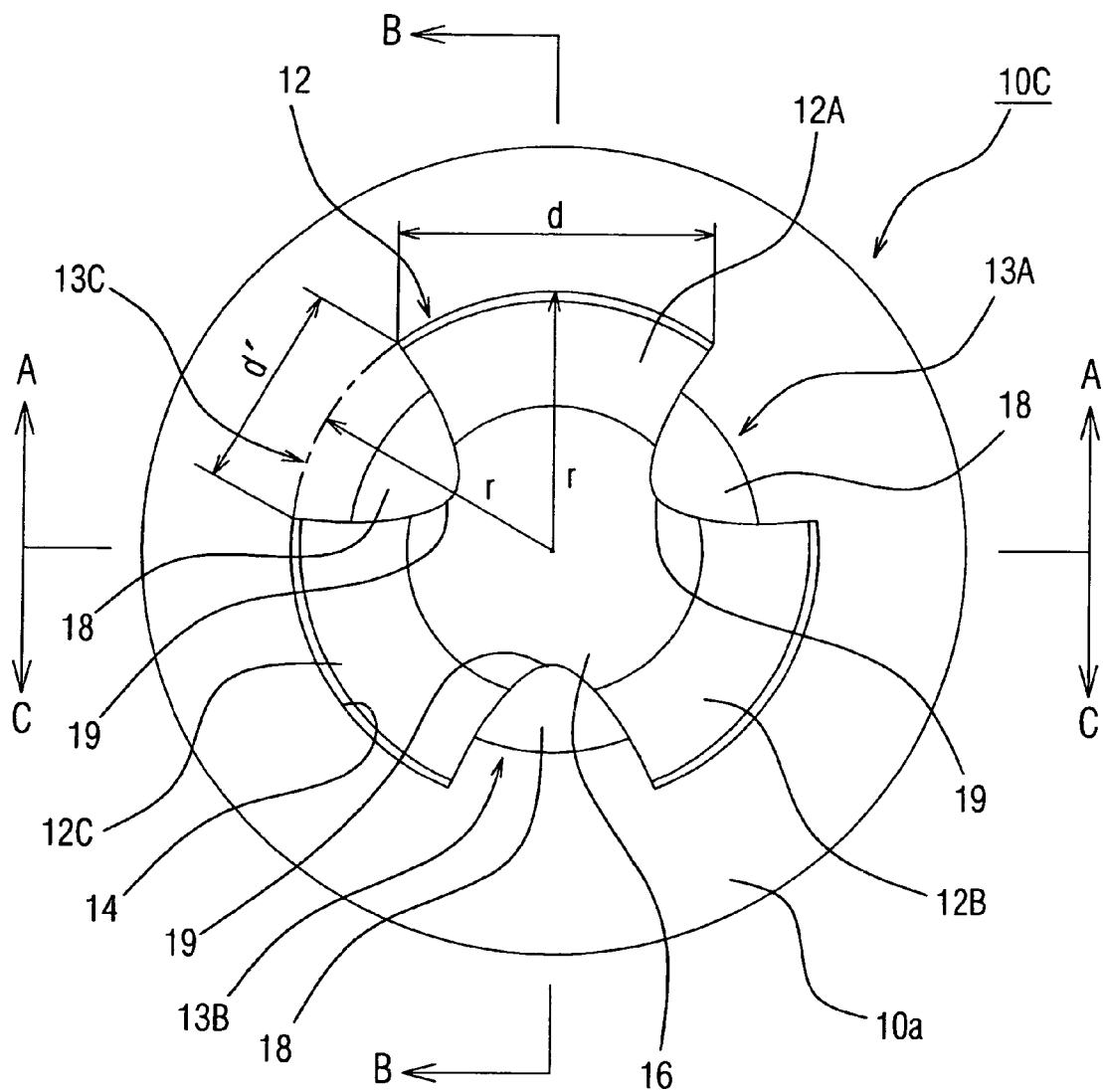
FIG. 9 is a top view of the head of a screw with stabilized strength in which the head is constructed as a pan-shaped head as a third embodiment of the screw with stabilized strength according to the present invention.
Figure 10:
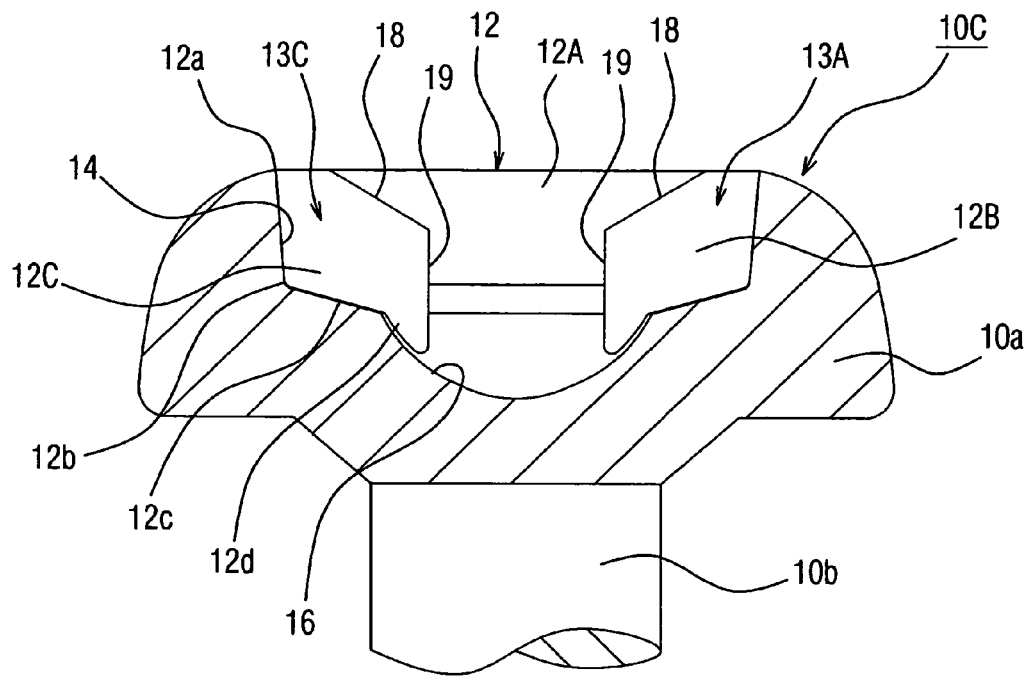
FIG. 10 is a sectional view of the essential portion taken along the line A-A in the screw with stabilized strength of the embodiment shown in FIG. 9.
Figure 11:
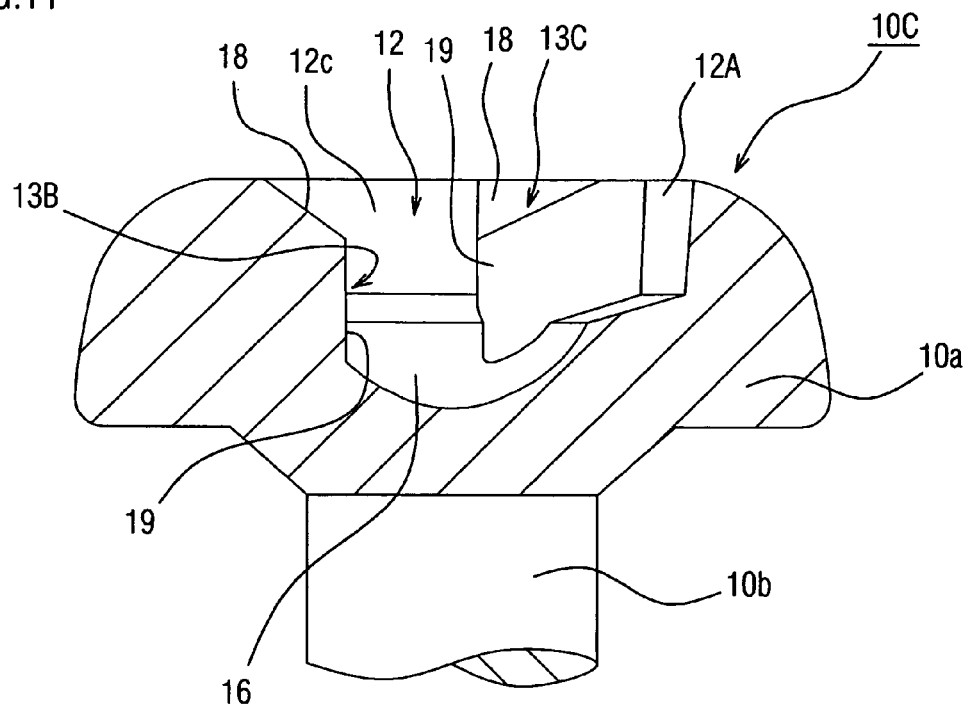
FIG. 11 is a sectional view of the essential portion taken along the line B-B in the screw with stabilized strength of the embodiment shown in FIG. 9.
Figure 12:
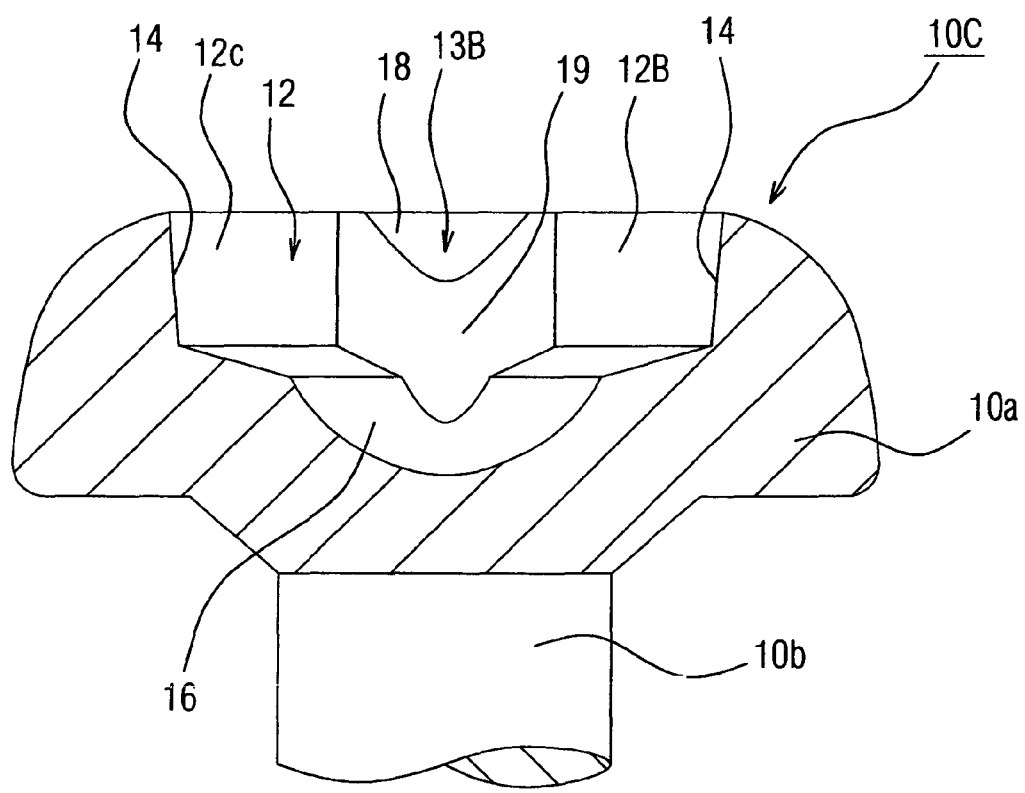
FIG. 12 is a sectional view of the essential portion taken along the line C-C in the screw with stabilized strength of the embodiment shown in FIG. 9.
Figure 13:
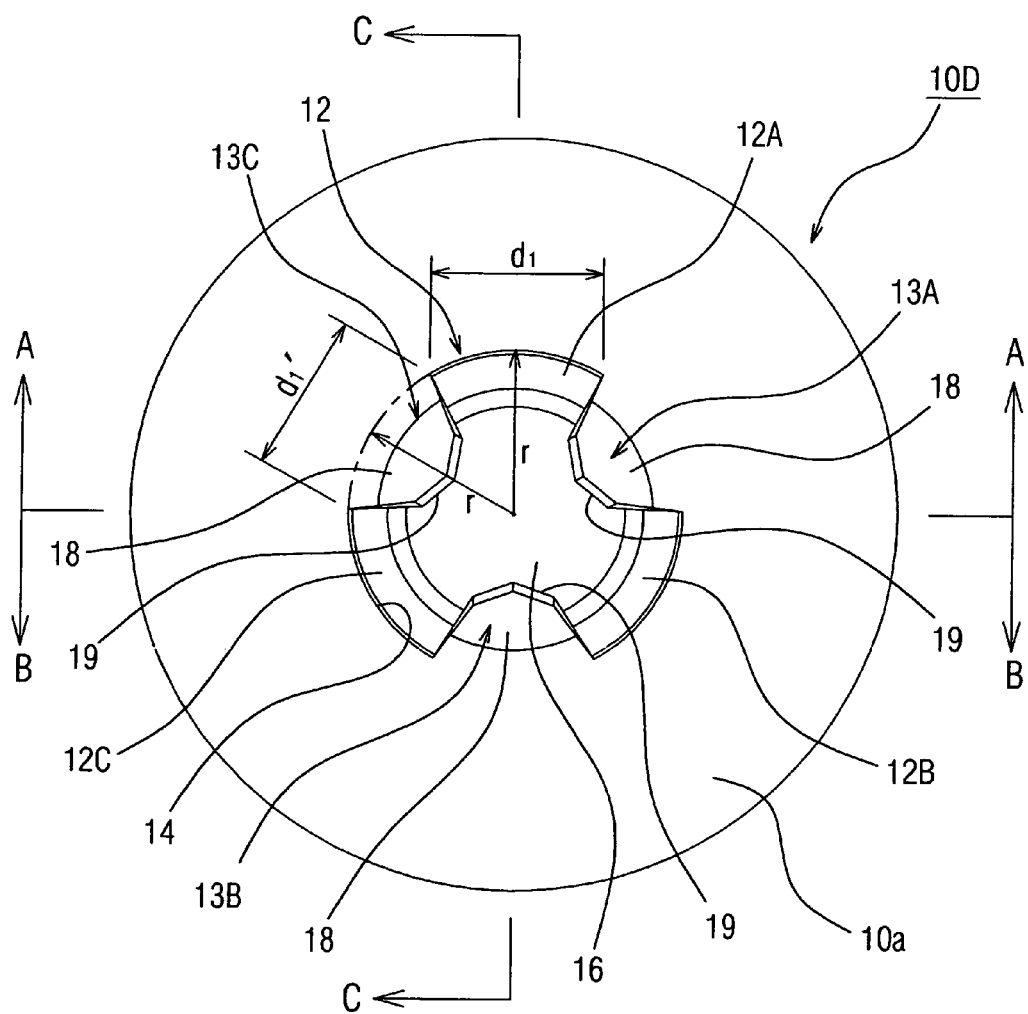
FIG. 13 is a top view of the head of a screw with stabilized strength in which the head is constructed as a pan-shaped head as a fourth embodiment of the screw with stabilized strength according to the present invention.
Figure 14:
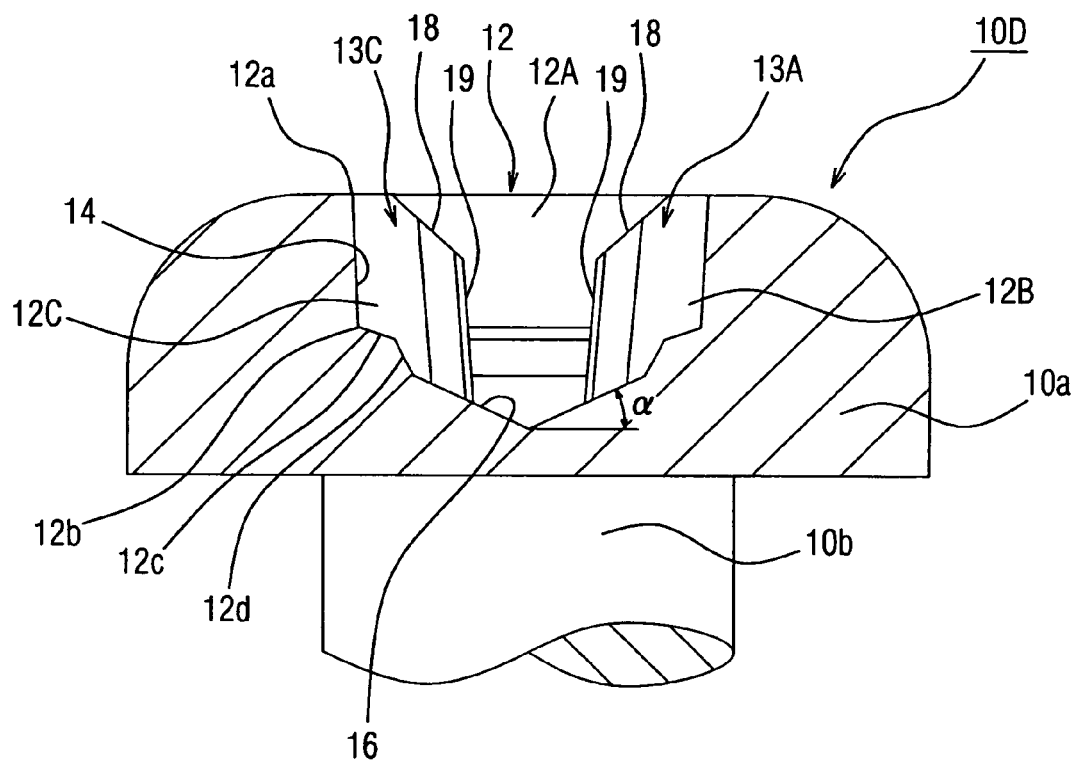
FIG. 14 is a sectional view of the essential portion taken along the line A-A in the screw with stabilized strength of the embodiment shown in FIG. 13.
Figure 15:
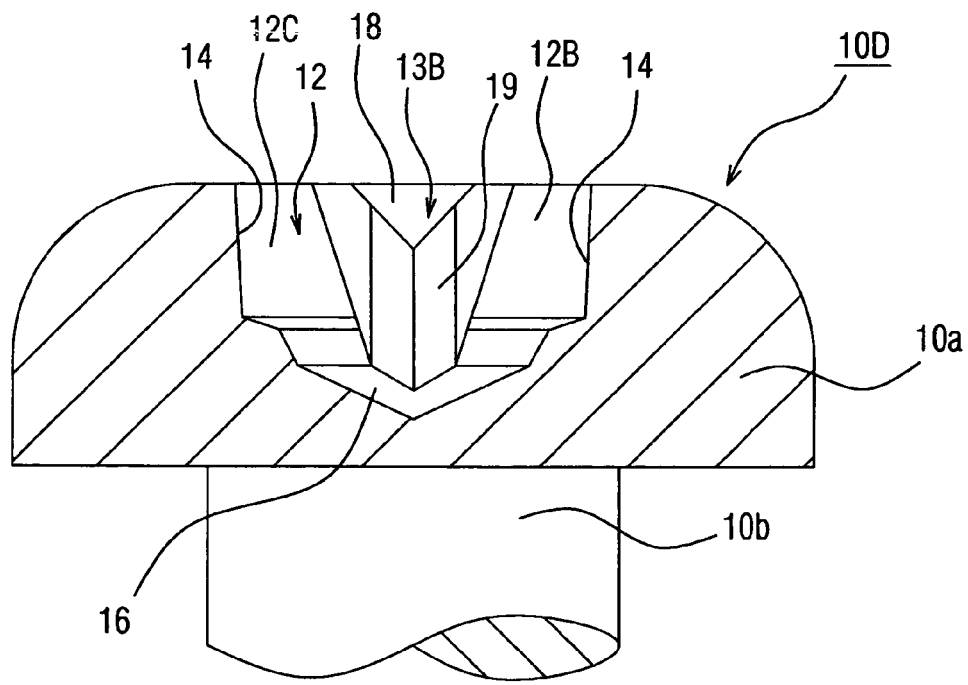
FIG. 15 is a sectional view of the essential portion taken along the line B-B in the screw with stabilized strength of the embodiment shown in FIG. 13.
Figure 16:
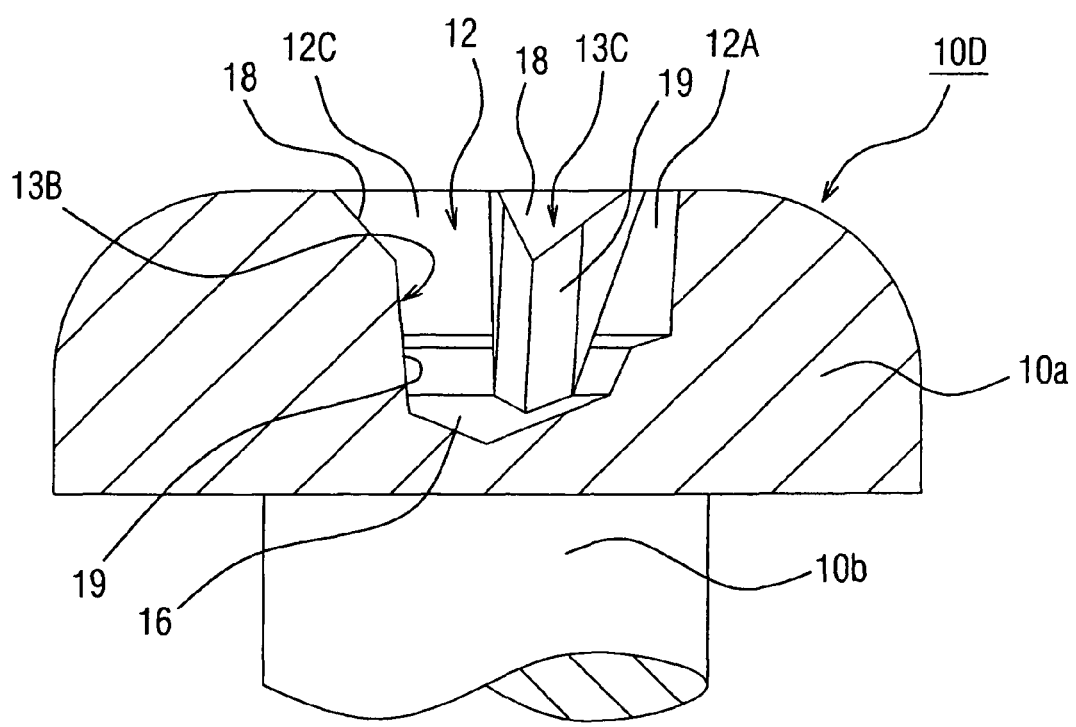
FIG. 16 is a sectional view of the essential portion taken along the line C-C in the screw with stabilized strength of the embodiment shown in FIG. 13.
Figure 17:
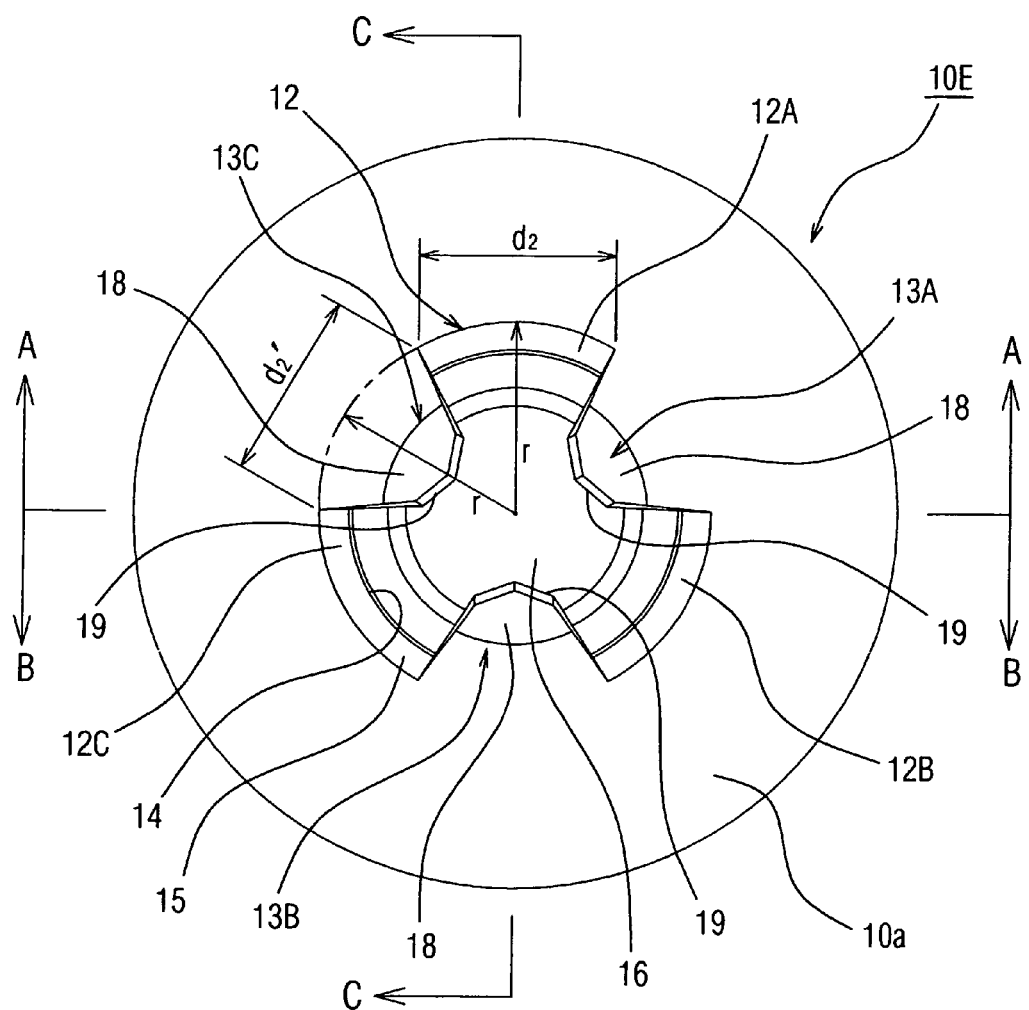
FIG. 17 is a top view of the head of a screw with stabilized strength in which the head is constructed as a pan-shaped head as a fifth embodiment of the screw with stabilized strength according to the present invention.
Figure 18:
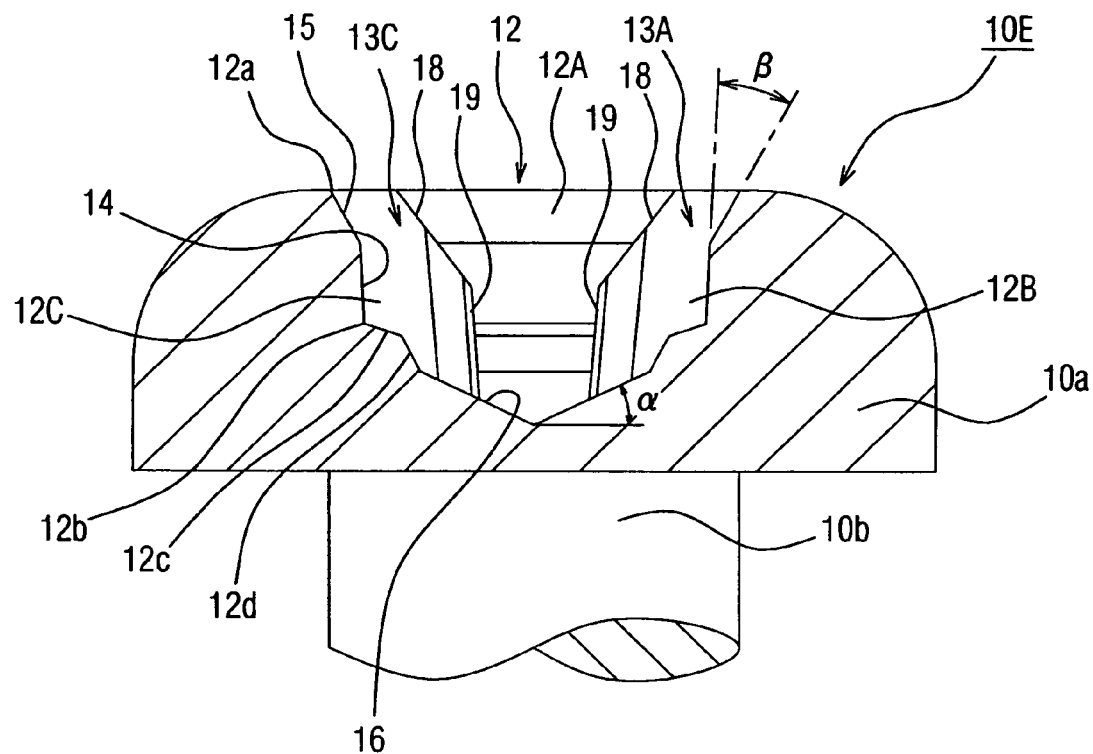
FIG. 18 is a sectional view of the essential portion taken along the line A-A in the screw with stabilized strength of the embodiment shown in FIG. 17.
Figure 19:
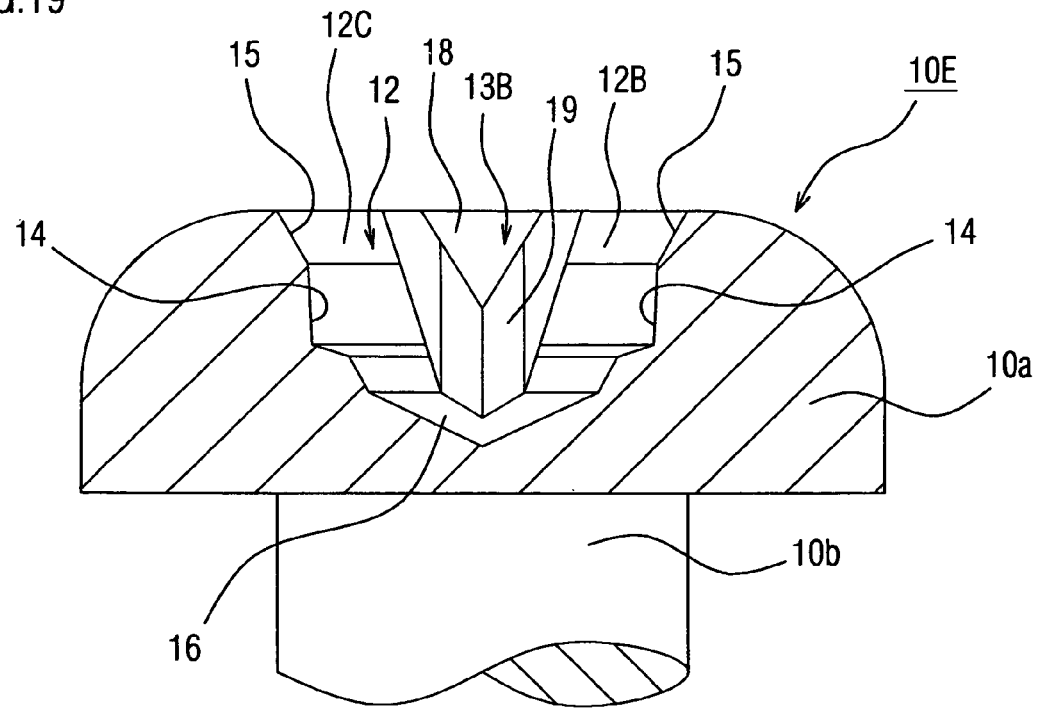
FIG. 19 is a sectional view of the essential portion taken along the line B-B in the screw with stabilized strength of the embodiment shown in FIG. 17.
Figure 20:
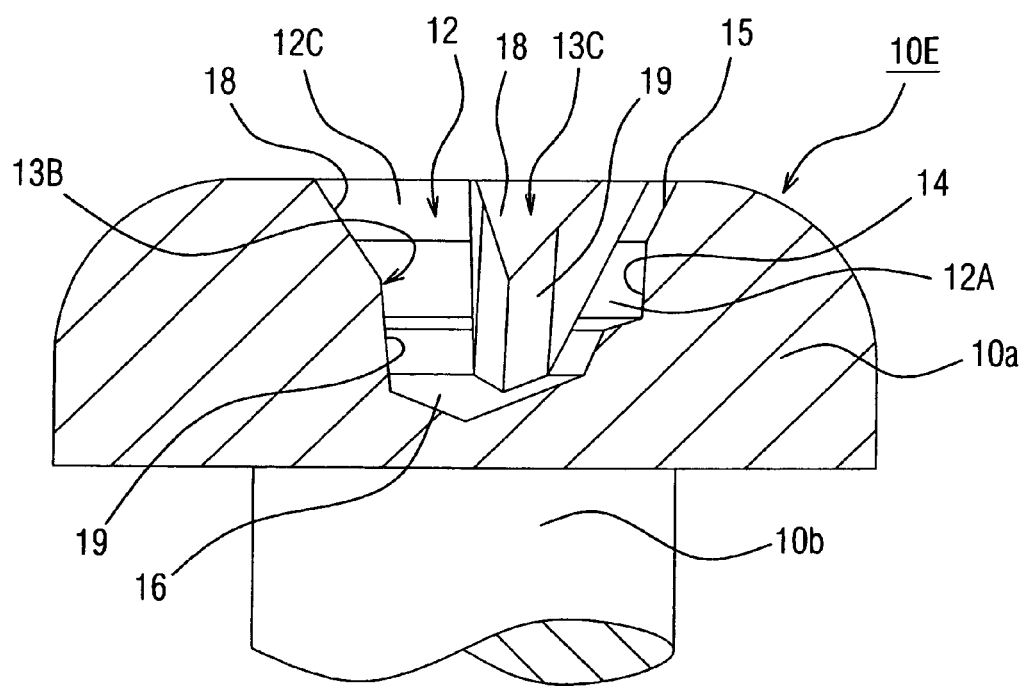
FIG. 20 is a sectional view of the essential portion taken along the line C-C in the screw with stabilized strength of the embodiment shown in FIG. 17.
Figure 21:
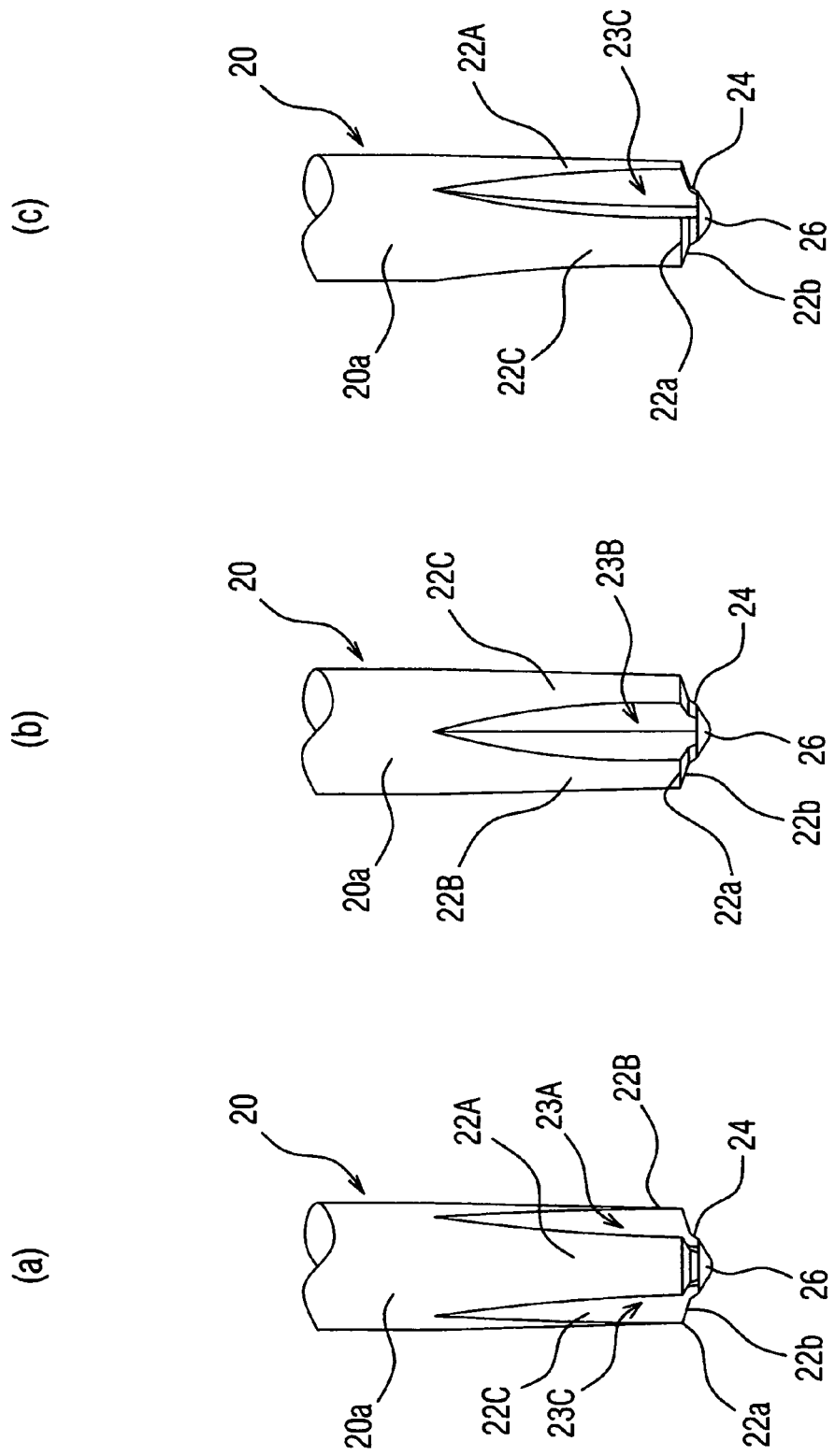
FIG. 21(a) is a front view of the essential portion showing one embodiment of the screwdriver bit of the present invention equipped with a bit tip end that matches the screw with stabilized strength of the present invention.
FIG. 21(b) is a back view of the essential portion of the screwdriver bit shown in FIG. 21(a).
FIG. 21(c) is left-side view of the essential portion of the screwdriver bit shown in FIG. 21(a).

Furthermore, the respective outer circumferential end wall surfaces 14 of the bit engaging groove 12 are formed so that these wall surfaces 14 are substantially perpendicular to a specified depth from the opening edge part 12a, and step parts 12c and 12d which are displaced at an inclination downward toward the central portion of the screw neck 10b from the perpendicular lower edge portion 12b are respectively provided. Furthermore, the intersecting central portion of the respective inclined step parts 12d has a construction formed as a substantially circular conical bottom surface 16 having a gradual inclination angle α of approximately 15 to 35° with respect to the horizontal plane that is perpendicular to the screw shaft (see FIG. 2). Furthermore, the boundary portions 13A, 13B and 13C between the respective adjacent branching grooves of the bit engaging groove 12 are formed so that these boundary portions are adjacent via respective planar side wall surfaces that intersect with left-right symmetry with respect to the respective branching grooves in the central portion of the bit engaging groove 12. Furthermore, the boundary portions 13A, 13B and 13C may also be bent side wall surfaces showing left-right symmetry as shown in Embodiment 3 illustrated in FIG. 9.

In the screw with stabilized strength 10A of the present embodiment constructed as described above, smooth screw tightening can be accomplished by appropriately engaging the tip end blade part of a screwdriver bit 20 (described later) constructed so as to match the bit engaging groove 12 formed in a Y shape divided into three substantially equal parts in the circumferential direction as described above with this bit engaging groove 12.

Furthermore, in the screw with stabilized strength 10A of the present embodiment, it would also be possible to use a construction in which the step parts 12c and 12d that are displaced at an inclination downward from the perpendicular lower edge portion 12b of the bit engaging groove 12 are omitted, so that the perpendicular lower edge portion 12b is displaced downward toward the central portion of the screw neck 10b from the perpendicular lower edge portion 12b (see FIGS. 5 through 8).

Embodiment 2

Example of Construction 2 of Screw with Stabilized Strength

FIGS. 5 through 8 show another embodiment of the screw with stabilized strength according to the present invention. More specifically, in FIGS. 5 through 8, the reference numeral 10B indicates the screw with stabilized strength of this embodiment. The head 10a of this screw 10B is formed in the shape of a pan, and a bit engaging groove 12 is formed in the center of the top part of the head 10a.

The bit engaging groove 12 of the screw with stabilized strength 10B in the present embodiment is basically the same as the bit engaging groove 12 of the screw with stabilized strength 10A described in the above-described Embodiment 1. Accordingly, portions of the construction that are the same as the construction described in the above-described FIGS. 1 through 4 are labeled with the same reference numerals, and a detailed description of such portions is omitted. However, the bit engaging groove 12 of the screw with stabilized strength 10B of the present embodiment is characterized in that the respective outer circumferential end wall surfaces 14 of the bit engaging groove 12 are formed as inclined surfaces 15 that expand in width at a specified angle β of approximately 15 to 35° on the opening edge part 12a side, and that these surfaces are formed as perpendicular surfaces to a specified depth as in the above-described Embodiment 1. In all other respects, this screw is the same as the screw with stabilized strength 10A described in the above-described Embodiment 1.

In the screw with stabilized strength 10B of the present embodiment constructed as described above, as in the above-described Embodiment 1, smooth screw tightening can be accomplished by appropriately engaging the tip end blade part of a screwdriver bit 20 (described later), which is constructed so as to match the bit engaging groove 12 formed in a Y shape divided into three substantially equal parts, with this bit engaging groove 12.

In particular, in the screw with stabilized strength 10B of the present embodiment, as a result of the respective circumferential end wall surfaces 14 of the bit engaging groove 12 being formed as inclined surfaces 15 that are caused to expand in width at a specified angle β on the opening edge part 12a side, screw tightening of at least two types of screws with stabilized strength 10B having different dimensions can be accomplished using a single screwdriver bit even in cases where screwdriver bits 20 constructed so as to match screws with stabilized strength 10B set at somewhat different dimensions are respectively used. More specifically, specified screw tightening work can be accomplished by causing the step parts formed on the tip end blade part of the screwdriver bit 20 (described later) to engage with the inclined surfaces 15 of the bit engaging groove 12.

Furthermore, in the screw with stabilized strength 10B of the present embodiment, a construction is employed in which the step parts 12c and 12d that are displaced downward at an inclination from the perpendicular lower edge portion 12b of the bit engaging groove 12 are omitted, and the perpendicular lower edge portion 12b is displaced downward toward the central portion of the screw neck 10b.

Embodiment 3

Example of Construction 3 of Screw with Stabilized Strength

FIGS. 9 through 12 show a third embodiment of the screw with stabilized strength of the present invention. More specifically, in FIGS. 9 through 12, the reference numeral 10C indicates the screw with stabilized strength of the present embodiment; and the head 10a of this screw 10C is formed in the shape of a pan, and a bit engaging groove 12 is formed in the center of the top part of this head.

The bit engaging groove 12 of the screw with stabilized strength 10C in the present embodiment has a construction which is formed in a Y shape divided into three substantially equal parts in the circumferential direction at a specified radial distance r from the central portion of the screw head 10a. In this case, the groove width d of the respective branching grooves 12A, 12B and 12C extending in the direction of the radius r from the central portion of the bit engaging groove 12 is formed so that this width gradually expands, thus causing the width d to be substantially equal to the width dimension d' of the boundary portions 13A, 13B and 13C between the respective adjacent branching grooves (see FIG. 9).

In addition, the respective outer circumferential end wall surfaces 14 of the bit engaging groove 12 are formed so that these wall surfaces are substantially perpendicular surfaces with a draft-angle taper of approximately 1° to 5° to a specified depth from the opening edge part 12a, and respective step parts 12c are provided that are displaced at an inclination downward toward the central portion of the screw neck 10b from the perpendicular lower edge portion 12b. Furthermore, the intersecting central portion of the respective inclined step parts 12c is formed as the bottom surface 16 which is substantially a circular recessed part (see FIG. 10).

Furthermore, this screw has a construction in which the surface of the screw head 10a that forms the boundary portions 13A, 13B and 13C between the respective adjacent branching grooves of the bit engaging groove 12 respectively forms inclined surface portions 18 that are inclined gradually downward at an angle of approximately 20 to 50° toward the central portion of the bit engaging groove 12. In this case, the boundary portions 13A, 13B and 13C between the respective adjacent branching grooves of the bit engaging groove 12 are formed so that these boundary portions are adjacent via bent side wall surfaces 19 showing left-right symmetry with respect to the respective branching grooves in the central portion of the bit engaging groove 12.

Furthermore, in the present embodiment, the bottom surface 16 of the circular recessed part is formed over a broader range that the relatively shallow position before the tip end edges of the bent side wall surfaces 19; however, the bottom surface 16 of this circular recessed part may be formed over a range that is relatively more limited than the shallow position before the tip end edge of the bent side wall surfaces 19.

In the screw with stabilized strength 10C of the present embodiment constructed as described above, smooth screw tightening work can be accomplished by appropriately engaging the tip end blade part of a screwdriver bit 20 (described later), which is constructed so as to match the bit engaging groove 12 formed in a Y shape divided into three substantially equal parts in the circumferential direction as described above, with this bit engaging groove 12. In particular, in the screw with stabilized strength 10C of the present embodiment, as a result of respective inclined surface portions 18 formed on the boundary portions 13A, 13B and 13C between the respective adjacent branching grooves of the bit engaging groove 12, the advantage that an appropriate engagement operation of the tip end blade part of the screwdriver bit 20 with the bit engaging groove 12 can be accomplished quickly and smoothly is obtainable.

Embodiment 4

Example of Construction 4 of Screw with Stabilized Strength

FIGS. 13 through 16 show a fourth embodiment of the screw with stabilized strength according to the present invention. More specifically, in FIGS. 13 through 16, the reference numeral 10D indicates the screw with stabilized strength of the present embodiment. The head 10a of this screw 10D is formed in the shape of a pan, and a bit engaging groove 12 is formed in the center of the top part of this head 10a.

The bit engaging groove 12 of the screw with stabilized strength 10D in this embodiment has a construction formed in a Y shape divided into three substantially equal parts in the circumferential direction at a specified radial distance r from the central portion of the screw head 10a. In this case, the groove width $d_1$ of the respective branching grooves 12A, 12B and 12C that extend in the direction of the radius r from the central portion of the bit engaging groove 12 is formed so that this width expands gradually to an interval that is substantially equal to the width dimension $d_1$' of the boundary portions 13A, 13B and 13C between the respective adjacent branching grooves ($d_1=d_1$') (see FIG. 13).

Furthermore, the respective outer circumferential end wall surfaces 14 of the bit engaging groove 12 are formed so that these wall surfaces are substantially perpendicular surfaces with a draft-angle taper of approximately 1° to 5° to a specified depth from the opening edge part 12a, and respective step parts 12c and 12d that are displaced at an inclination downward toward the central portion of the screw neck 10b from the perpendicular lower edge portion 12b are provided. Furthermore, the intersecting central portion of the above-described respective inclined step parts 12d is formed as a substantially circular conical bottom surface 16 with a gradual angle of inclination a of approximately 15 to 35° with respect to the horizontal plane that is perpendicular to the screw shaft (see FIG. 14).

Furthermore, this screw has a construction in which the surface of the screw head 10a that forms the boundary portions 13A, 13B and 13C between the respective adjacent branching grooves of the bit engaging groove 12 respectively forms inclined surface portions 18 that are inclined gradually downward at an angle of approximately 20 to 50° toward the central portion of the bit engaging groove 12 (see FIGS. 13 through 16). In this case, the boundary portions 13A, 13B and 13C between the respective adjacent branching grooves of the bit engaging groove 12 are formed so that these boundary portions are adjacent via planar side wall surfaces 19 which intersect at an obtuse angle showing left-right symmetry with respect to the respective branching grooves in the central portion of the bit engaging groove 12.

In the screw with stabilized strength 10D of the present embodiment constructed as described above, smooth screw tightening work can be accomplished by appropriately engaging the tip end blade part of a screwdriver bit 20 (described later), which is constructed so as to match the bit engaging groove 12 formed in a Y shape divided into three substantially equal parts in the circumferential direction as described above, with this bit engaging groove 12. In the screw with stabilized strength 10D of the present embodiment as well, such an advantage that an appropriate engagement operation of the tip end blade part of the screwdriver bit 20 with the bit engaging groove 12 can be accomplished quickly and smoothly is obtained as a result of respective inclined surface portions 18 formed on the boundary portions 13A, 13B and 13C between the respective branching grooves of the bit engaging groove 12.

Furthermore, in the screw with stabilized strength 10D of the present embodiment, a construction may be employed in which the step parts 12c and 12d that are displaced downward at an inclination from the perpendicular lower edge portion 12b of the bit engaging groove 12 are omitted, and the perpendicular lower edge portion 12b is displaced downward toward the central portion of the screw neck 10b (see FIGS. 5 through 8).

Embodiment 5

Example of Construction 5 of Screw with Stabilized Strength

FIGS. 17 through 20 show a fifth embodiment of the screw with stabilized strength according to the present invention. More specifically, in FIGS. 17 through 20, the reference numeral 10E indicates the screw with stabilized strength of the present embodiment; and the head 10a of this screw 10E is formed in the shape of a pan, and a bit engaging groove 12 is formed in the center of the top part of this head.

The bit engaging groove 12 of the screw with stabilized strength 10E of the present embodiment is basically the same as the bit engaging groove 12 of the screw with stabilized strength 10D of the above-described Embodiment 4. Accordingly, constituent elements that are the same as in the construction shown in FIGS. 13 through 16 are labeled with the same reference numerals, and a detailed description of such parts is omitted. Furthermore, the bit engaging groove 12 of the screw with stabilized strength 10E of the present embodiment is characterized in that the respective outer circumferential end wall surfaces 14 of the bit engaging groove 12 are formed as inclined surfaces 15 that expand at a specified angle β of approximately 15 to 35° on the opening edge part 12a side ($d_2=d_2'$), and, as in the above-described Embodiment 2, these surfaces are formed as substantially perpendicular surfaces with a draft-angle taper of approximately 1° to 5° to a specified depth from the lower edge part 12a'.

In the screw with stabilized strength 10E of the present embodiment constructed as described above, as in the above-described Embodiment 4, smooth screw tightening work can be accomplished by appropriately engaging the tip end blade part of a screwdriver bit 20 (described later), which is constructed so as to match the bit engaging groove 12 formed in a Y shape divided into three substantially equal parts in the circumferential direction as described above, with this bit engaging groove 12.

Figure 24:
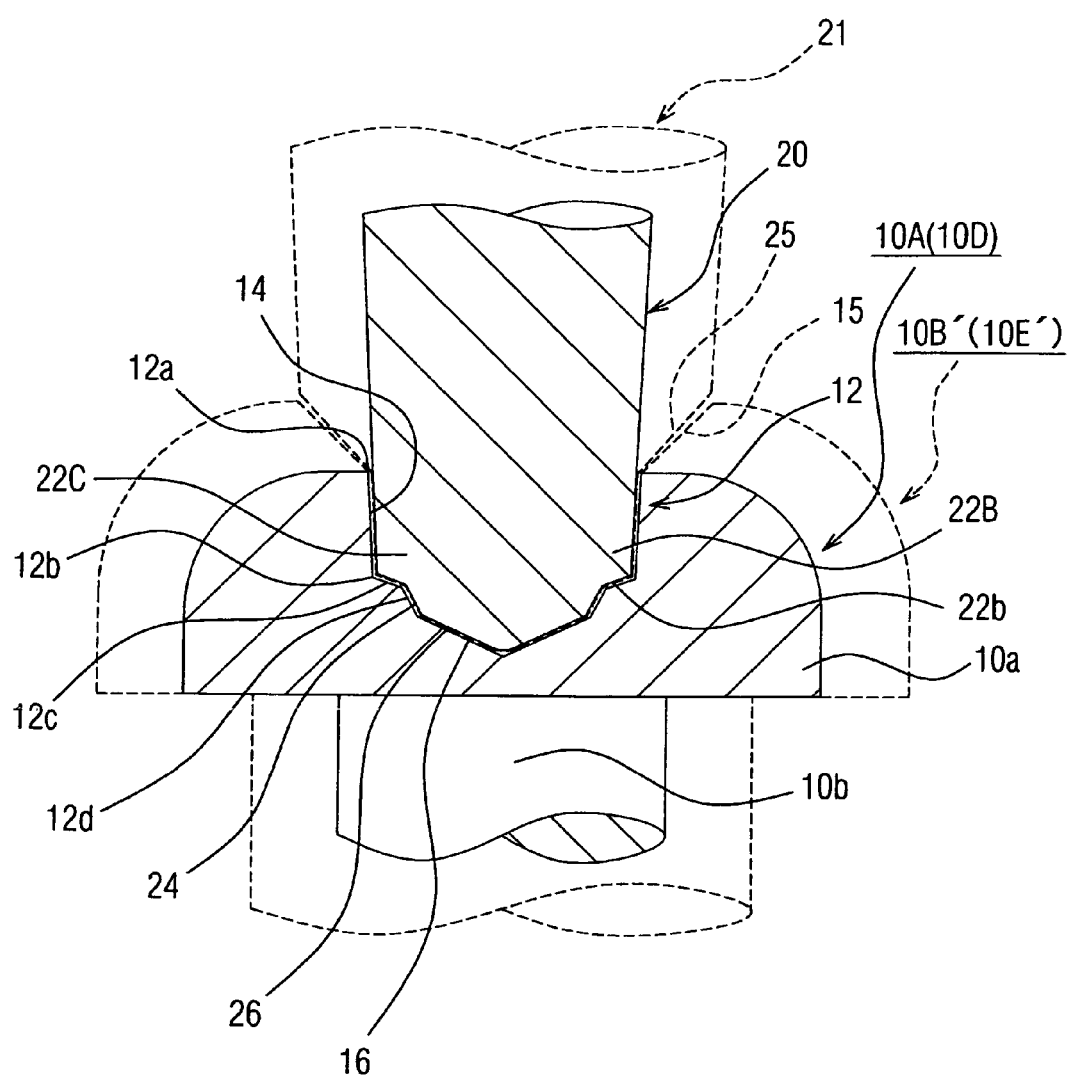
FIG. 24 is a sectional side view of the essential portion showing the connected state of the screw with stabilized strength of the first embodiment or fourth embodiment shown in FIG. 1 and FIG. 13 and the screwdriver bit shown in FIGS. 21(a) through 21(c).
Figure 25:
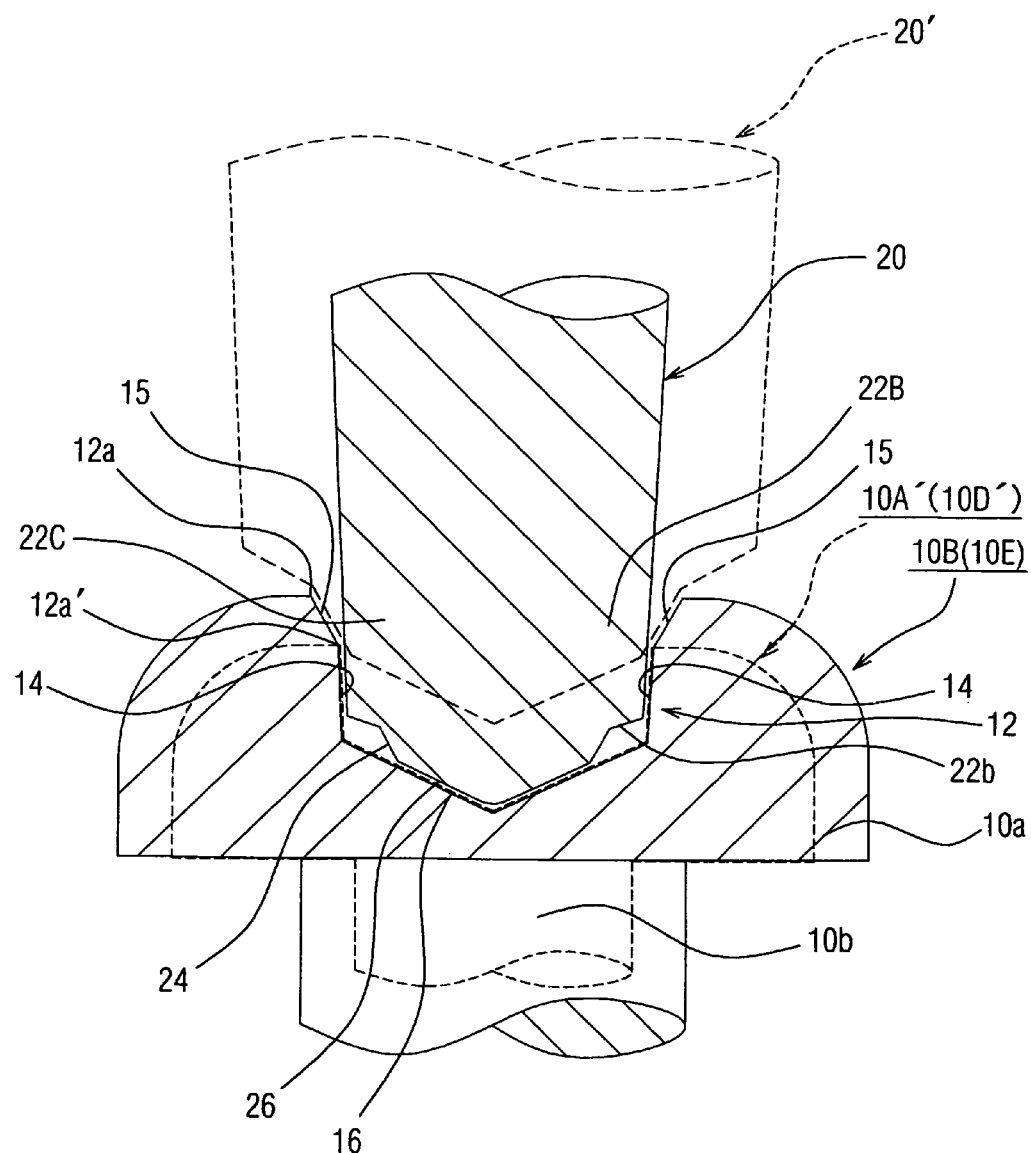
FIG. 25 is a sectional side view of the essential portion showing the connected state of the screw with stabilized strength of the second embodiment or fifth embodiment shown in FIG. 5 and FIG. 17 and the screwdriver bit shown in FIGS. 21(a) through 21(c).

In particular, in the screw with stabilized strength 10E of the present embodiment, since the respective outer circumferential end wall surfaces 14 of the bit engaging groove 12 are formed as inclined surfaces 15 that are formed so that these surfaces expand in width at a specified angle of β on the opening edge part 12a side, the screw fastening of at least two types of screws with stabilized strength 10B, 10A' (10D'), 10E having different dimension can be accomplished using a single screwdriver bit 20 even in cases where screwdriver bits 20 constructed so as to accomplish a respective match with screws with stabilized strength 10B (10E) that are set at somewhat different dimensions are respectively used (see FIG. 25). Furthermore, in the screw with stabilized strength 10E of the present embodiment, with a screwdriver bit 21 in which a step part is formed on the tip end blade part so as to match the bit engaging groove 12, the screw tightening work of two types of screws with stabilized strength 10A (10D), 10B' having different dimensions can be accomplished using the single screwdriver bit 21 constructed in this manner (see FIG. 24).

Furthermore, in the screw with stabilized strength 10E of the present embodiment as well, it would also be possible to use a construction in which the step parts 12c and 12d that are displaced downward at an inclination from the perpendicular lower edge portion 12b of the bit engaging groove 12 are omitted, and the perpendicular lower edge portion 12b is displaced downward toward the central portion of the screw neck 10b.

Embodiment 6

Example of Construction 1 of Screwdriver Bit

FIGS. 21(a), 21(b), 21(c) and 22 show one embodiment of a screwdriver bit 20 that is suitable for use on the screws with stabilized strength 10A, 10B, 10C, 10D and 10E of the present invention.

The screwdriver bit 20 of the present embodiment has a taper so that the tip end blade part 20a is slightly pointed toward the tip ends that respectively engage with the bit engaging groove 12 that is formed in a Y shape divided into three substantially equal parts in the circumferential direction in the head 10a of each of the above-described screws with stabilized strength. Furthermore, the screwdriver bit 20 comprises vane parts 22A, 22B and 22C in which the end edge parts 22a are formed in a substantially right-angled or obtuse-angular shape. The tip ends of the respective vane parts 22A, 22B and 22C form horizontal to gradually inclined surfaces 22b toward the center axis of the screwdriver bit 20, and respectively form step parts 24 that match the inclined step parts (12c, 12d) of the bit engaging groove 12. Furthermore, a protruding part 26 that protrudes in a circular conical shape is formed at the intersecting central portion of the step parts 24.

Figure 22:
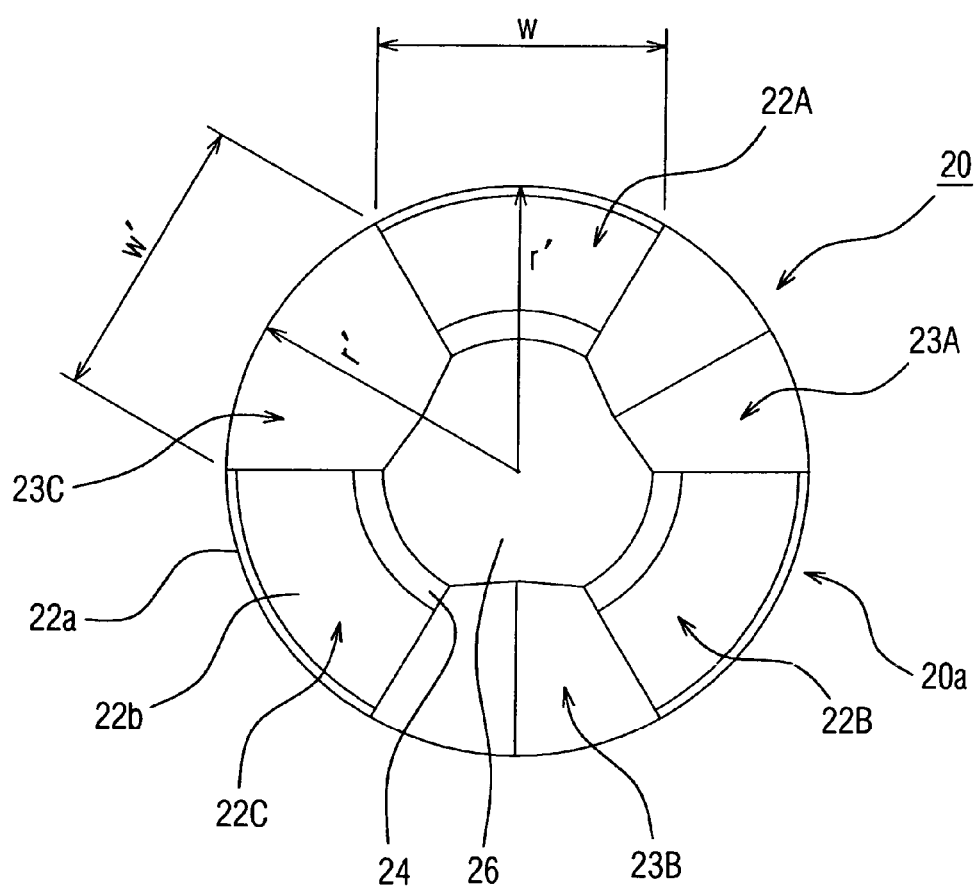
FIG. 22 is an enlarged bottom view of the screwdriver bit of the present invention shown in FIGS. 21(a) through 21(c).

In the screwdriver bit 20 of the present embodiment, so as to correspond to with the bit engaging groove 12 formed in a Y shape divided into three substantially equal parts in the circumferential direction in the head 10a of each of the above-described screws with stabilized strength, the vane widths w of the respective vane parts 22A, 22B and 22C, which extend in the direction of the radius r' from the center axis of the screwdriver bit 20, are formed so that these widths gradually expand to become substantially equal to the width dimension w' of the cut-in parts 33A, 33B and 33C between the respective adjacent vane parts (see FIG. 22).

In the screwdriver bit 20 of the present embodiment constructed as described above, as is shown in FIGS. 23 through 25, the respective vane parts 22A, 22B and 22C quickly and smoothly engage with the respective branching grooves 12A, 12B and 12C of the bit engaging groove 12 formed in a Y shape divided into three substantially equal parts in the circumferential direction in the head 10a of the screw with stabilized strength 10A, 10B, 10C, 10D or 10E, so that the phenomenon of "come-out" can be easily and securely prevented. Furthermore, a smooth torque transmission in the screw tightening work is accomplished, and stabilization of strength in the screw head that has the bit engaging groove and in the tip end blade part of the screwdriver bit can easily be accomplished. Furthermore, in cases where the perpendicular lower edge portion 12b of the bit engaging groove 12 is formed so as to be displaced downward toward the central portion of the screw neck 10b instead of providing the step parts 12c and 12d in the bit engaging groove 12 in the above-described screw with stabilized strength 10A, 10B, 10C, 10D or 10E, then the tip ends of the respective vane parts 22A, 22B and 22C can be formed as inclined parts that match the displaced portions of the bit engaging groove 12.

A. Example 1 of Connection Between the Screw with Stabilized Strength of the Present Invention and the Screwdriver Bit of the Present Embodiment FIG. 23 is a sectional side view of the essential portion showing the engaged state between the screw with stabilized strength 10C of the third embodiment of the present invention and the screwdriver bit 20 (see FIGS. 21 and 22) of the present embodiment.

Figure 23:
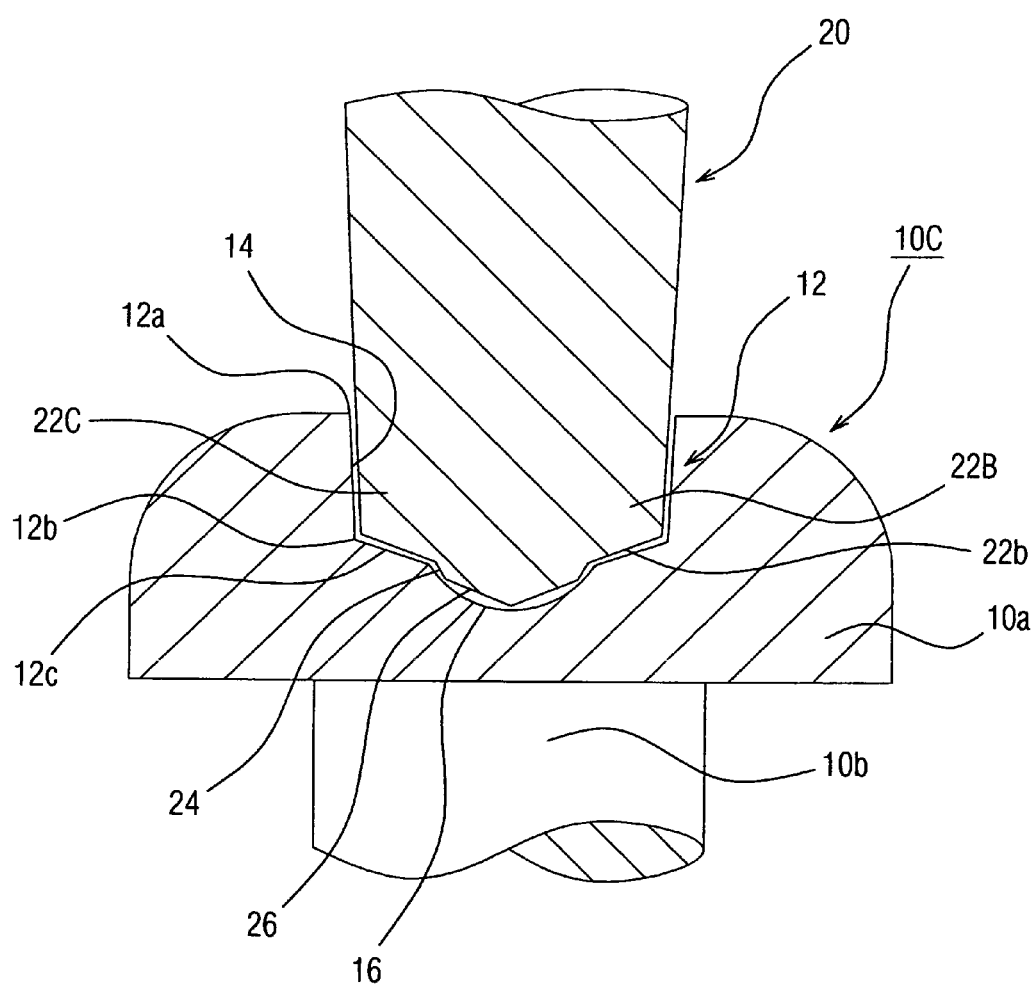
FIG. 23 is a sectional side view of the essential portion showing the connected state of the screw with stabilized strength of the third embodiment shown in FIG. 9 and the screwdriver bit shown in FIGS. 21(a) through 21(c).

More specifically, as is clear from FIG. 23, a specified torque can be transmitted to the screw with stabilized strength 10C, so that smooth and appropriate screw tightening work is accomplished by inserting the end edge parts 22a, step parts 24 and protruding parts 26 formed on the respective vane parts 22A, 22B and 22C of the screwdriver bit 20 along the respective perpendicular outer circumferential end wall surfaces 14 formed in the respective branching grooves 12A, 12B and 12C of the bit engaging groove 12 of the screw with stabilized strength 10C, and by anchoring or engaging these parts respectively with the inclined step parts 12c and bottom surface 16 of the round recessed part, and then by turning the screwdriver bit 20.

B. Example 2 of Connection Between the Screw with Stabilized Strength of the Present Invention and the Screwdriver Bit of the Present Embodiment FIG. 24 is a sectional side view of the essential portion showing the engaged state between the screw with stabilized strength 10A or 10D of the first or fourth embodiment of the present invention and the screwdriver bit 20 (see FIGS. 21 and 22) of the present embodiment.

More specifically, as is clear from FIG. 24, a specified torque can be transmitted to the screw with stabilized strength 10A (10D), so that smooth and appropriate screw tightening work is accomplished by inserting the end edge parts 22a, step parts 24 and protruding parts 26 formed on the respective vane parts 22A, 22B and 22C of the screwdriver bit 20 along the respective perpendicular outer circumferential end wall surfaces 14 formed in the respective branching grooves 12A, 12B and 12C of the bit engaging groove 12 of the screw with stabilized strength 10A (10D), by anchoring or engaging these parts respectively with the inclined step parts 12c and 12d and circular conical bottom surface 16, and then by turning the screwdriver bit 20.

In particular, in the present embodiment, as is shown in FIG. 24, a screwdriver bit 21 (indicated by the broken line) in which step parts 25 (indicated by the broken line) that engage with the inclined surfaces 15 formed with an expanding width on the opening edge part 12a side of the bit engaging groove 12 of the screw with stabilized strength 10B' (10E') as shown in the figures are further formed on the vane parts (22A, 22B, 22C) of the screwdriver bit 21 is usable for screws with stabilized strength 10A (10D) set at somewhat different dimensions and for screws with stabilized strength 10B' (10E') (indicated by a broken line) having large dimensions based on the second embodiment or fifth embodiment. Thus, in the present embodiment, for screws with stabilized strength 10A (10D) and 10B' (10E'), screw tightening work of screws with stabilized strength 10A (10D) and 10B' (10E') of this type can be smoothly accomplished using the single screwdriver bit 21.

C. Example 3 of Connection Between the Screw with Stabilized Strength of the Present Invention and the Screwdriver Bit of the Present Embodiment FIG. 25 is a sectional side view of the essential portion showing the engaged state between the screw with stabilized strength 10B or 10E of the second embodiment or fifth embodiment of the present invention and the screwdriver bit 20 (see FIGS. 21 and 22) of the present embodiment.

More specifically, in this case as well, as is clear from FIG. 25, a specified torque can be transmitted to the screw with stabilized strength 10C so that smooth and appropriate screw tightening work can be accomplished by inserting the end edge parts 22a, step parts 24 and protruding parts 26 formed on the respective vane parts 22A, 22B and 22C of the screwdriver bit 20 along the respective perpendicular outer circumferential end wall surfaces 14 formed in the respective branching grooves 12A, 12B and 12C of the bit engaging groove 12 of the screw with stabilized strength 10B (10E), and by turning the screwdriver bit 20.

In particular, in the present embodiment, as seen from FIG. 25, in cases where screwdriver bit 20 and 20' that are constructed so as to match screws with stabilized strength having respectively different sizes are respectively used for screws with stabilized strength 10B (10E) of somewhat different sizes and for screws with stabilized strength 10A' (10D') (indicated by a broken line) having small dimensions based on the first embodiment or fourth embodiment, then screw tightening work can be smoothly accomplished for the screws with stabilized strength 10B (10E) by engaging the steps 24 formed on the vane parts of the screwdriver bit 20' (indicated by a broken line) having large dimensions with the inclined surfaces 15 formed with an expanding width on the opening edge part 12a side of the bit engaging groove 12 of the screw with stabilized strength 10B (10E). Furthermore, the screwdriver bit 20 that matches the screw with stabilized strength 10B' having small dimensions can also accomplish screw tightening work smoothly by being engaged with the bit engaging groove 12 of the screw with stabilized strength 10B (10E) as shown in the figures. Thus, in the present embodiment, for screws with stabilized strength 10B (10E) and 10A' (10D') having different dimensions, not only is it possible to use a plurality of screwdriver bits 20 and 20', but the tightening work of screws with stabilized strength 10B (10E) and 10A' (10D') of this type can be smoothly accomplished using the single screwdriver bit 20.

Embodiment 7

Figure 26:
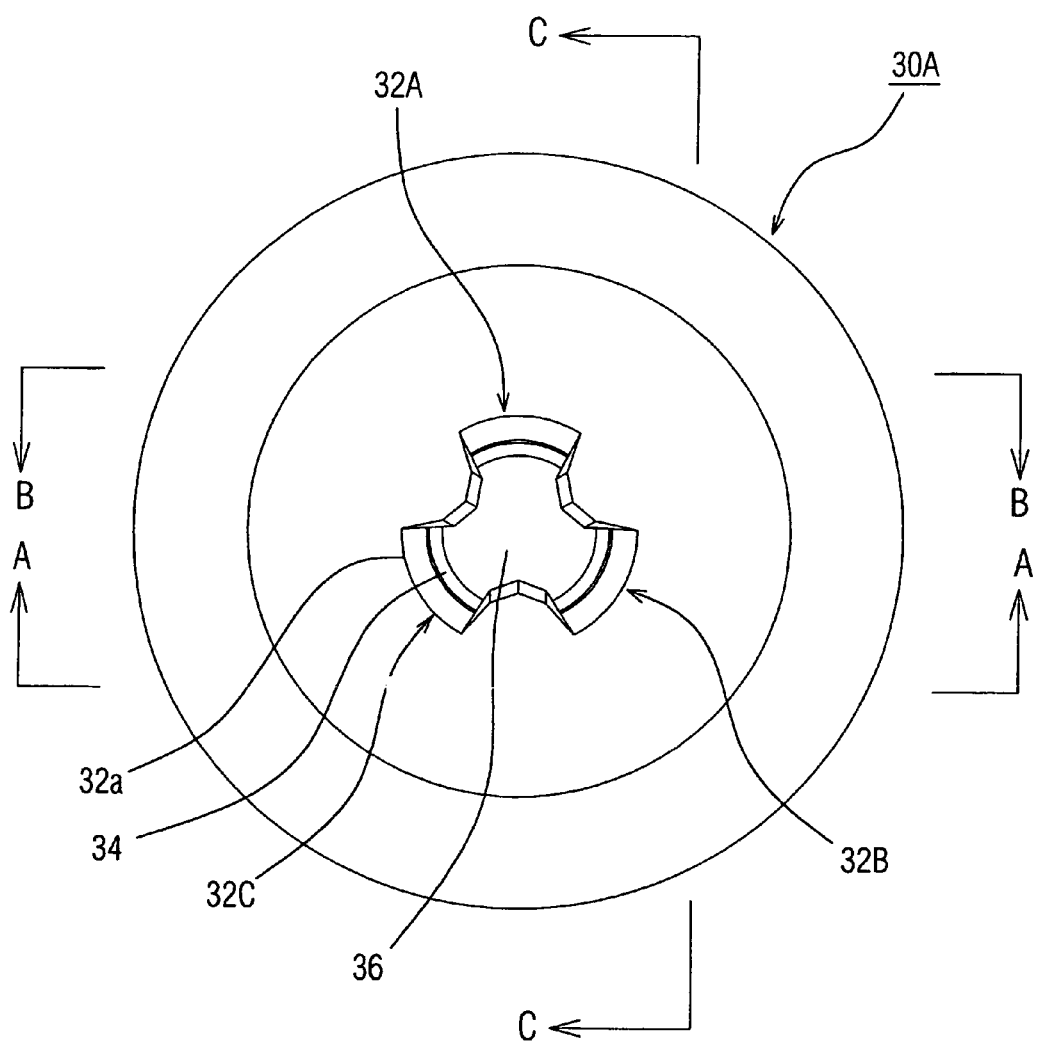
FIG. 26 is a top view of the essential portion of the screw manufacturing header punch of the present invention used to form the head and bit engaging groove of the screw with stabilized strength of the first embodiment shown in FIG. 1.
Figure 27:
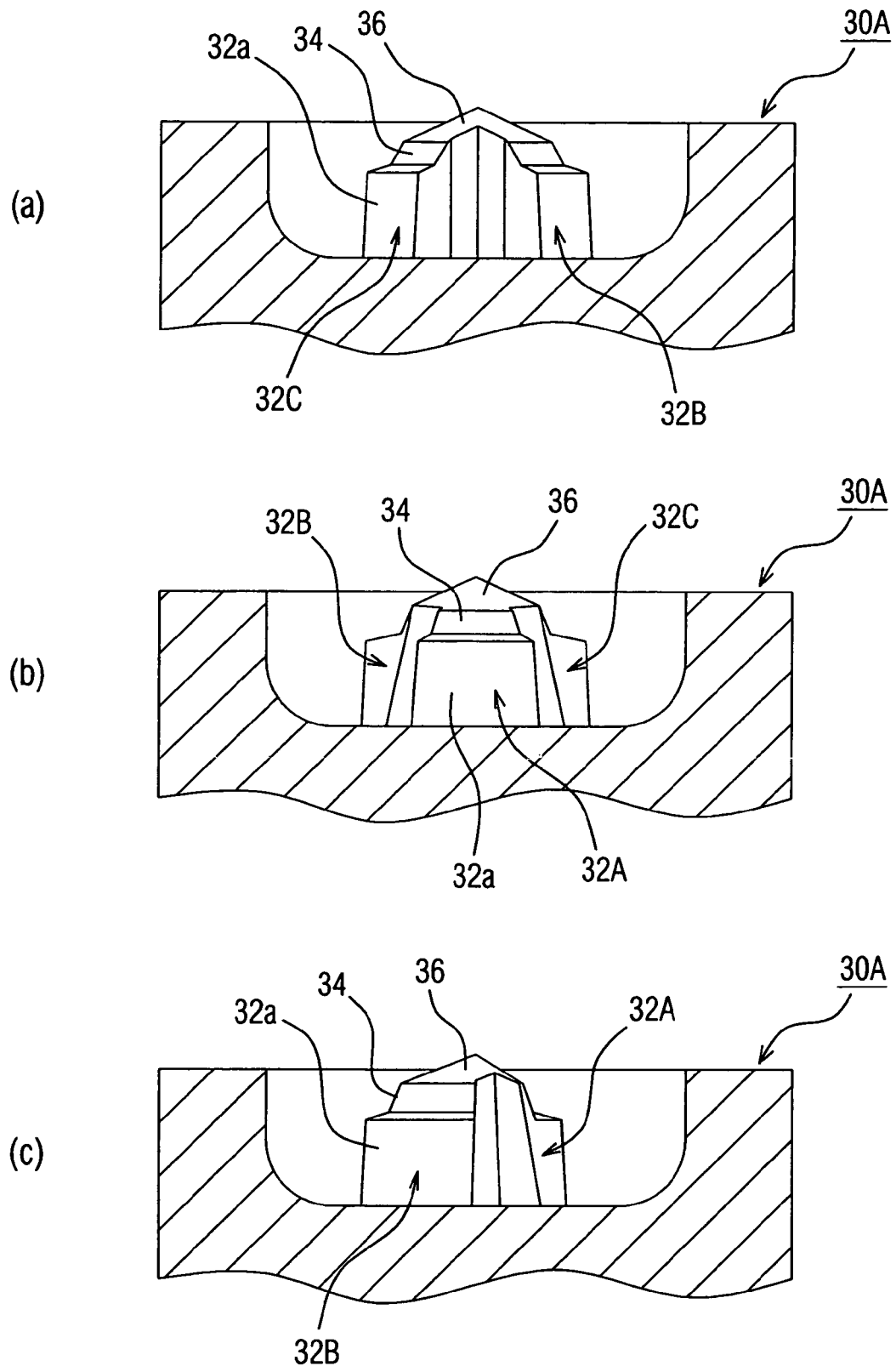
FIG. 27(a) is a sectional view of the essential portion taken along the line A-A in FIG. 26.
FIG. 27(b) is a sectional view of the essential portion taken along the line B-B in FIG. 26.
FIG. 27(c) is a sectional view of the essential portion taken along the line C-C in FIG. 26.

Example of Construction 1 of Header Punch Used to Manufacture Screw with Stabilized Strength FIGS. 26 and 27(*a*), 27(*b*) and 27(*c*) show an embodiment of the header punch 30A that is used to manufacture the screw with stabilized strength 10A of Embodiment 1 shown in FIGS. 1 through 4.

The header punch 30A of the present embodiment is provided with protruding parts 32A, 32B and 32C respectively having perpendicular end wall parts 32*a* used to form the respective outer circumferential end wall surfaces 14 in the respective branching grooves 12A, 12 and 12C of the bit engaging groove 12 formed in a Y shape divided into three substantially equal parts in the circumferential direction in the screw head 10*a* so that these outer circumferential end wall surfaces are substantially perpendicular. Furthermore, step parts 34 used to form the inclined step parts 12*c* and 12*d* in the respective branching grooves 12A, 12 and 12C of the bit engaging groove 12 are respectively formed on the tip ends of the protruding parts 32A, 32B and 32C, and a circular conical protruding part 36 which is used to form the substantially circular conical bottom surface 16 is disposed in the intersecting central portion of the step parts 34.

Accordingly, the header punch 30A of the present embodiment allows easy manufacture of the screw with stabilized strength 10A described in the above-described Embodiment 1.

Furthermore, for the screw with stabilized strength 10A in which the perpendicular lower edge portion 12*b* of the bit engaging groove 12 is displaced downward toward the central portion of the screw neck 10*b* in instead of providing the inclined step parts 12*c* and 12*d* formed in the bit engaging groove 12, the header punch 30A takes the construction in which the step parts 34 that are used to form the inclined step parts 12*c* and 12*d* are omitted, and a circular conical protruding part 36 that is used to form the substantially circular conical bottom part 16 is disposed in the central portion.

Embodiment 8

Figure 28:
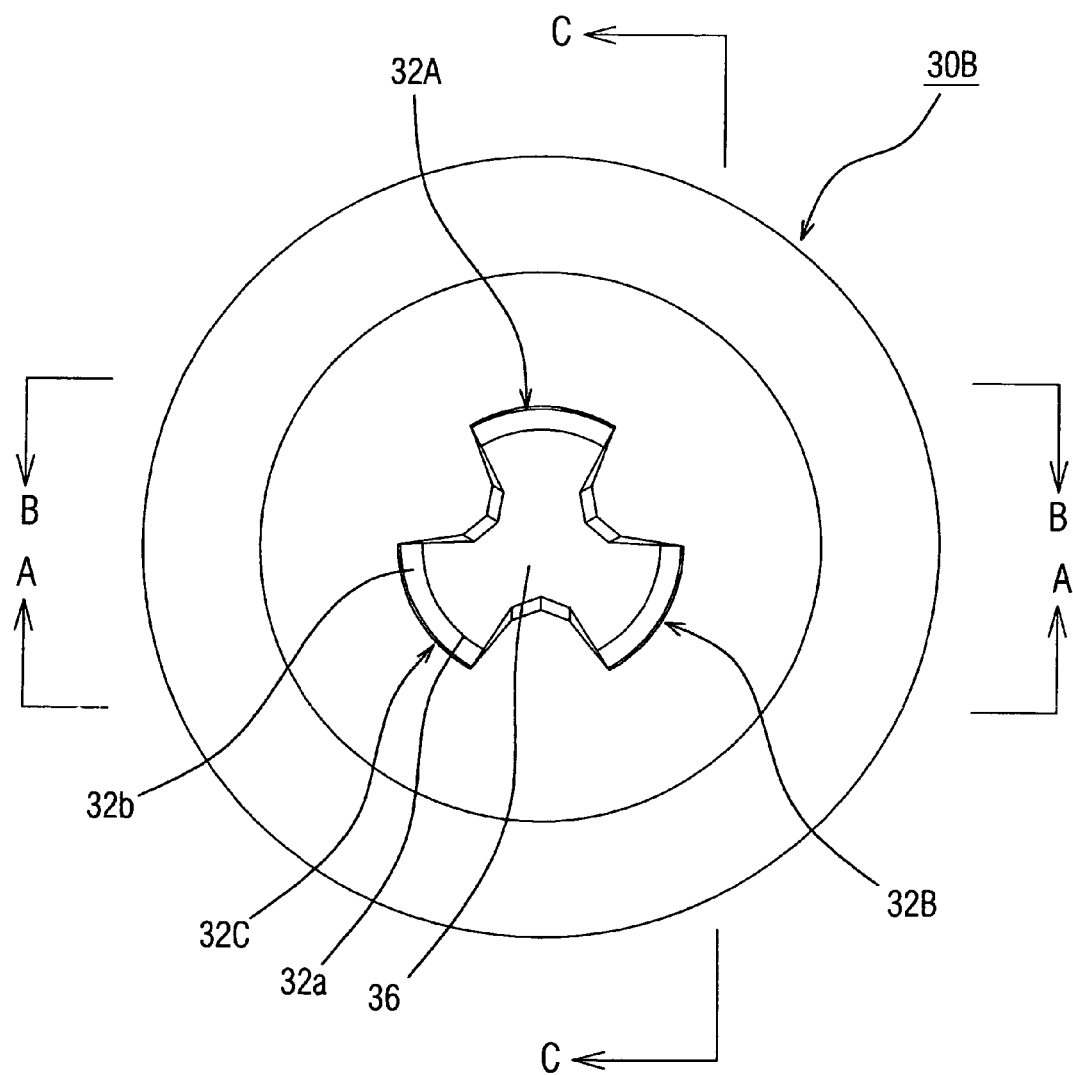
FIG. 28 is a top view of the essential portion of the screw manufacturing header punch of the present invention used to form the head and bit engaging groove of the screw with stabilized strength of the second embodiment shown in FIG. 5.
Figure 29:
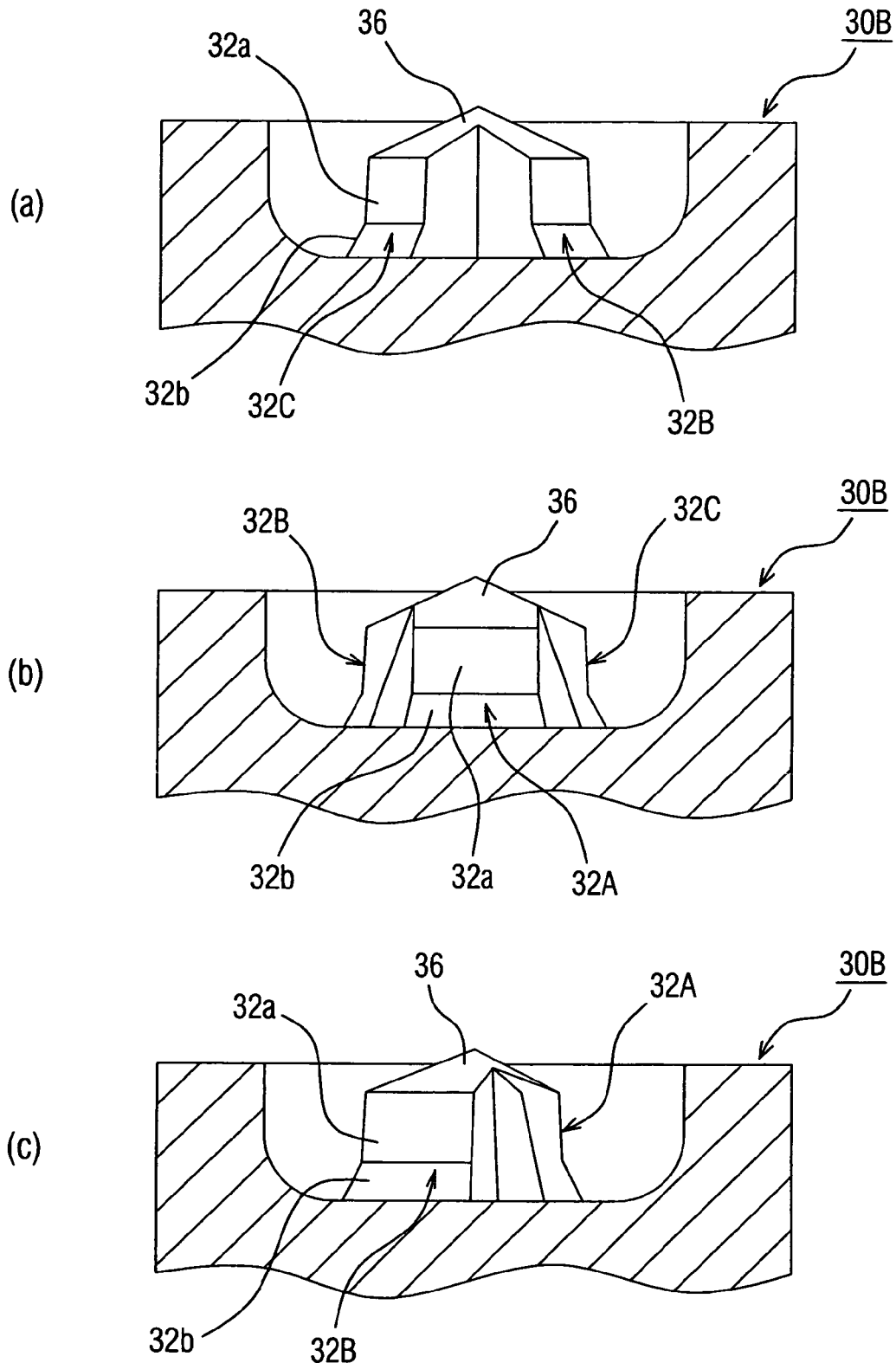
FIG. 29(a) is a sectional view of the essential portion taken along the line A-A in FIG. 28.
FIG. 29(b) is a sectional view of the essential portion taken along the line B-B in FIG. 28.
FIG. 29(c) is a sectional view of the essential portion taken along the line C-C in FIG. 28.

Example of Construction 2 of Header Punch Used to Manufacture Screw with Stabilized Strength FIGS. 28 and 29(*a*), 29(*b*) and 29(*c*) show an embodiment of the header punch 30B that is used to manufacture the screw with stabilized strength 10B of Embodiment 2 shown in FIGS. 5 through 8.

The header punch 30B of the present embodiment is respectively provided with protruding parts 32A, 32B and 32C respectively having inclined end wall parts 32*b*, which are used to form the respective outer circumferential end wall surfaces 14 in the respective branching grooves 12A, 12 and 12C of the bit engaging groove 12 formed in a Y shape divided into three substantially equal parts in the circumferential direction in the screw head 10*a* so that these outer circumferential end wall surfaces expand in width on the opening edge part 12*a* side at a specified angle of β, and perpendicular end wall parts 32*a*, which are used to form these outer circumferential end wall surfaces 14 so that these outer circumferential end wall surfaces are substantially perpendicular. Furthermore, a circular conical protruding part 36, which is used to form the above-described substantially circular conical bottom surface 16, is disposed on the tip ends of the protruding parts 32A, 32B and 32C.

Accordingly, the header punch 30B of the present embodiment allows easy manufacture of the screw with stabilized strength 10B described in the above-described Embodiment 2.

Furthermore, the header punch 30B of the present embodiment, as in the screw with stabilized strength 10A described above, can take a construction in which step parts 34 used to form respective inclined step parts 12*c* and 12*d* in the respective branching grooves 12A, 12 and 12C of the bit engaging groove 12 are respectively disposed on the tip ends of the protruding parts 32A, 32B and 32C, and a circular conical protruding part 36 that is used to form a substantially circular conical bottom surface 16 is disposed in the intersecting central portion of the step parts 34 (see FIG. 26, (*a*), (*b*) and (*c*) of FIG. 26).

Embodiment 9

Figure 30:
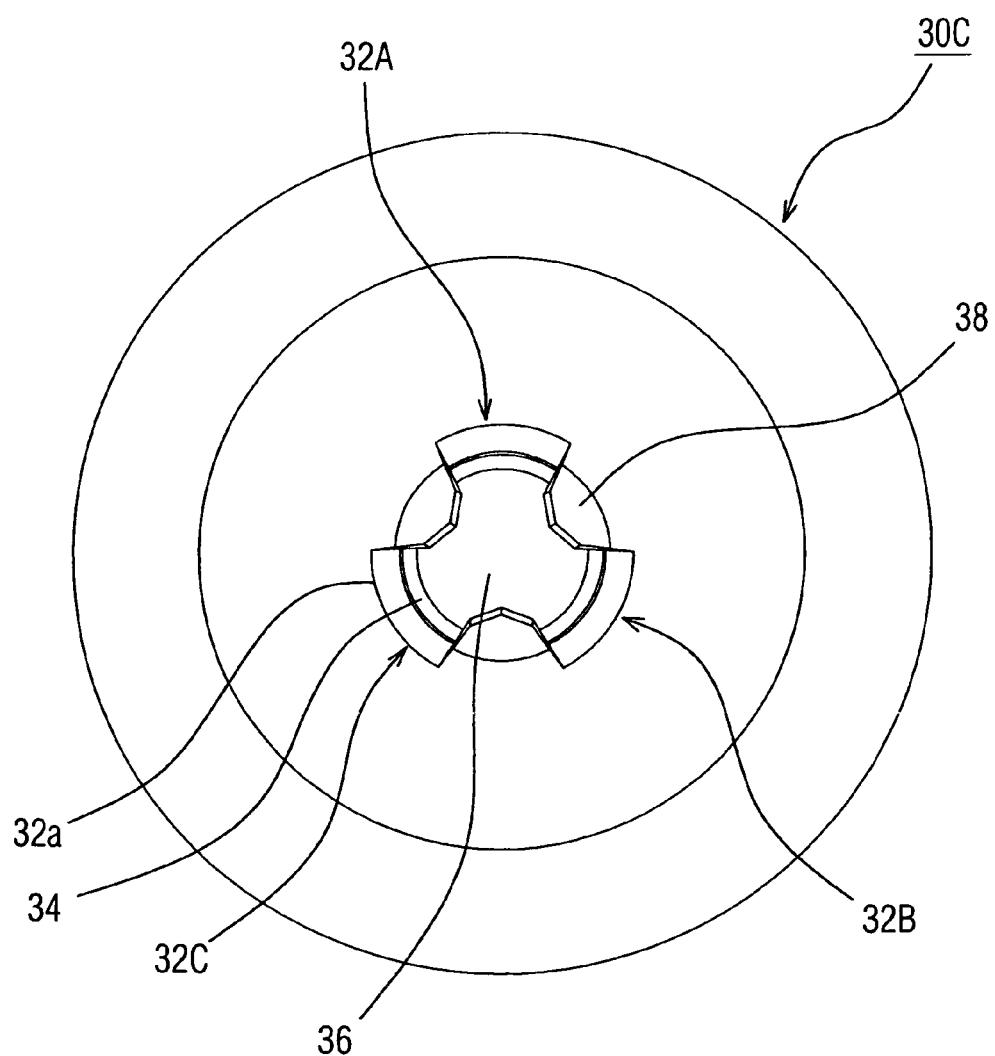
FIG. 30 is a top view of the essential portion of the screw manufacturing header punch of the present invention used to form the head and bit engaging groove of the screw with stabilized strength of the fourth embodiment shown in FIG. 13.

Example of Construction 3 of Header Punch Used to Manufacture Screw with Stabilized Strength FIG. 30 shows an embodiment of the header punch 30C that is used to manufacture the screw with stabilized strength 10D of Embodiment 4 shown in FIGS. 13 through 16.

The header punch 30C is basically the same as the construction of the header punch 30A described in the above-described Embodiment 7. Accordingly, constituent elements that are the same as in the construction shown in FIG. 26 are labeled with the same reference numerals, and a detailed description of such parts is omitted. The header punch 30C of the present embodiment has such a construction that inclined protruding parts 38 used to form inclined surface portions 18 that are inclined gradually downward toward the central portion of the bit engaging groove 12 (see FIG. 13) are disposed on the boundary portions which are between the respective protruding parts 32A, 32B and 32C that are adjacent in the circumferential direction of the base portions of the respective protruding parts 32A, 32B and 32C.

Accordingly, the header punch 30C of the present embodiment allows easy manufacture of the screw with stabilized strength 10D described in the above-described Embodiment 4.

Though not shown in the drawings, in regard to the header punches that are used to manufacture the screws with stabilized strength 10C and 10E of Embodiment 3 shown in FIGS. 9 through 12 and of Embodiment 5 shown in FIGS. 17 through 20 as well, such header punches can be obtained in the same manner as in the present embodiment described above by using a construction in which inclined protruding parts 38, which are used to form inclined surface portions 18 (see FIGS. 9 and 17) that are inclined gradually downward toward the central portion of the bit engaging groove 12, are formed on the boundary portions which are between the respective protruding parts that are adjacent in the circumferential direction of the base portions of the respective protruding parts in the protruding parts that are used to form the bit engaging groove 12 (see FIG. 30).

In the above description, combinations of screws with stabilized strength (applied to pan-shaped screws) and screwdriver bits, as well as header punches used to manufacture the screws, are described as preferred embodiments of the present invention. However, the present invention is not limited to such pan-shaped screws. For example, it goes without saying that the present invention is applicable to combinations of screws with stabilized strength, which are of the type of dish-shaped screws or screws of other types, and screwdriver bits, and further to header punches used to manufacture these screws. In addition, various design alterations are possible within ranges that involve no departure from the spirit of the present invention.

The invention claimed is:

1. A combination of a screw with stabilized strength and a screwdriver bit, wherein:
   in said screw with stabilized strength;
   a screw head of said screw is provided with a bit engaging groove that is formed in a Y shape divided into three equal parts in a circumferential direction at a specified radial distance from a central portion of said screw head, said screw head being formed in a shape of a pan,
   groove widths of respective branching grooves that extend in a radial direction from a central portion of said bit engaging groove are formed so that said widths gradually expand, thus producing substantially equal intervals with a width dimension of boundary portions which are between respective adjacent branching grooves being of substantially a same dimension as a width of the branching grooves,
   respective outer circumferential end wall surfaces of said bit engaging groove are formed in a substantially perpendicular attitude to a specified depth from an opening edge part, and step parts sloped downward toward a central portion of a screw neck from perpendicular lower edge portions are respectively provided from said specified depth to a bottom of an intersecting central portion of the bit engaging groove,
   the opening edge part of the respective outer circumferential end wall surfaces of the bit engaging groove is formed as an inclined surface that inclines upward at an angle of 15° to 35° from an inner diameter side toward outwardly radial direction,
   the bottom of the intersecting central portion of the bit engaging groove is formed as a bottom surface which is a circular conical recessed part provided thereon, and
   boundary portions between the respective adjacent branching grooves of the bit engaging groove are formed so that the boundary portions are formed by planar side wall surfaces that intersect at obtuse angles showing left-right symmetry with respect to respective branching grooves in the central portion of the bit engaging groove, and a surface of said screw head that forms said boundary portions is formed as an inclined surface portion that is inclined at an angle of 20° to 50° downward toward the central portion of said bit engaging groove; and
   said screwdriver bit comprises a tip end blade part, vane parts, inclined surface and step parts, and protruding parts, wherein
   said vane parts are respectively formed on said tip end blade part and have end edge parts that have a right-angled shape to obtuse angular shape and engage with respective branching grooves of said bit engaging groove formed substantially vertically from an opening edge section thereof and in a Y shape divided into three-equal parts in the circumferential direction in said screw head of said screw with stabilized strength,
   said inclined surface and step parts are respectively formed on tip ends of said respective vane parts so as to match the step parts of said bit engaging groove, and
   said protruding parts are formed to intersect and connect in a circular conical shape in a central axial part of the screwdriver bit, said protruding parts corresponding to the bottom surface of the circular conical recessed part.

2. The combination of the screw with stabilized strength and a screwdriver bit according to claim 1, wherein boundary portions between respective adjacent vane parts of the tip end blade part are formed so that the boundary portions are formed by planar side wall surfaces that intersect at obtuse angles showing left-right symmetry with respect to respective vane parts in the central portion of the tip end blade part and substep parts slope downward toward a central portion of said tip end blade part from perpendicular lower edge portions.

* * * * *